(12) United States Patent
Liu

(10) Patent No.: US 10,050,812 B2
(45) Date of Patent: Aug. 14, 2018

(54) METHODS AND APPARATUSES FOR INTERFERENCE CANCELLATION

(71) Applicant: HUAWEI TECHNOLOGIES CO., LTD., Shenzhen (CN)

(72) Inventor: Sheng Liu, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 15/369,526

(22) Filed: Dec. 5, 2016

(65) Prior Publication Data
US 2017/0085398 A1 Mar. 23, 2017

Related U.S. Application Data

(63) Continuation of application No. PCT/CN2014/080800, filed on Jun. 26, 2014.

(51) Int. Cl.
*H04B 1/10* (2006.01)
*H04L 25/03* (2006.01)
(Continued)

(52) U.S. Cl.
CPC ......... *H04L 25/03006* (2013.01); *H04B 1/10* (2013.01); *H04B 1/56* (2013.01);
(Continued)

(58) Field of Classification Search
CPC ........... H04L 25/03006; H04L 25/0212; H04L 25/0224; H04L 5/0048; H04L 25/03;
(Continued)

(56) References Cited

U.S. PATENT DOCUMENTS

| 5,691,978 A | 11/1997 | Kenworthy |
| 6,229,992 B1 | 5/2001 | McGeehan et al. |

(Continued)

FOREIGN PATENT DOCUMENTS

| CN | 101453228 A | 6/2009 |
| CN | 101656562 A | 2/2010 |

(Continued)

OTHER PUBLICATIONS

"MAXIM Single-/Dual-Band 802.11a/b/g World-Band Transceiver ICs," 2004 Maxim Integrated Products, Sunnyvale, CA, USA, pp. 1-39.

(Continued)

*Primary Examiner* — Michael Neff
(74) *Attorney, Agent, or Firm* — Leydig, Voit & Mayer, Ltd.

(57) ABSTRACT

Methods and apparatuses are provided to cancel a near-field reflected self-interference component. The method includes: obtaining a radio frequency receive signal by using a main receive antenna; performing interference cancellation processing on the radio frequency receive signal according to the radio frequency reference signal to generate a first processed signal; performing near-field reflected self-interference channel estimation according to a digital baseband reference signal corresponding to the radio frequency reference signal and according to a first digital signal obtained by sampling the first processed signal to obtain a near-field reflected self-interference component parameter; performing near-field reflected self-interference signal reconstruction according to the near-field reflected self-interference component parameter and the radio frequency reference signal to obtain a near-field reflected self-interference signal; and performing interference cancellation processing on the (Continued)

first processed signal according to the near-field reflected self-interference signal to obtain a second processed signal.

18 Claims, 11 Drawing Sheets

(51) Int. Cl.
    *H04W 4/80* (2018.01)
    *H04L 5/00* (2006.01)
    *H04B 1/56* (2006.01)
    *H04L 5/14* (2006.01)
    *H04L 25/02* (2006.01)

(52) U.S. Cl.
    CPC .......... *H04L 5/0048* (2013.01); *H04L 5/1461* (2013.01); *H04L 25/0212* (2013.01); *H04L 25/0224* (2013.01); *H04W 4/80* (2018.02)

(58) Field of Classification Search
    CPC ........ H04L 5/1461; H04W 4/008; H04B 1/10; H04B 1/56
    USPC ........................................................ 375/348
    See application file for complete search history.

(56) References Cited

U.S. PATENT DOCUMENTS

| | | | |
|---|---|---|---|
| 7,729,431 | B2 | 6/2010 | Gebara et al. |
| 7,804,760 | B2 | 9/2010 | Schmukler et al. |
| 8,249,540 | B1 | 8/2012 | Gupta et al. |
| 8,401,509 | B1 | 3/2013 | Gupta et al. |
| 8,977,223 | B1 | 3/2015 | Gupta et al. |
| 9,019,849 | B2 | 4/2015 | Hui et al. |
| 9,100,110 | B2 | 8/2015 | Wang et al. |
| 9,124,332 | B2 | 9/2015 | Wang et al. |
| 9,312,895 | B1 | 4/2016 | Gupta et al. |
| 2003/0098806 | A1 | 5/2003 | Green |
| 2008/0008126 | A1 | 1/2008 | Shirakabe et al. |
| 2008/0107046 | A1 | 5/2008 | Kangasmaa et al. |
| 2009/0233568 | A1 | 9/2009 | Zhang et al. |
| 2011/0285508 | A1 | 11/2011 | Kim |
| 2012/0002586 | A1 | 1/2012 | Gainey et al. |
| 2013/0301487 | A1 | 11/2013 | Khandani et al. |
| 2014/0016515 | A1 | 1/2014 | Jana et al. |
| 2014/0348018 | A1 | 11/2014 | Bharadia et al. |
| 2015/0156001 | A1 | 6/2015 | Lin et al. |
| 2015/0180640 | A1 | 6/2015 | Liu |
| 2015/0212194 | A1 | 7/2015 | Obiya et al. |
| 2016/0226653 | A1 | 8/2016 | Bharadia et al. |
| 2016/0285502 | A1 | 9/2016 | Liu |
| 2017/0005773 | A1 | 1/2017 | Liu et al. |
| 2017/0085398 | A1 | 3/2017 | Liu |
| 2017/0104506 | A1 | 4/2017 | Liu et al. |
| 2017/0111155 | A1 | 4/2017 | Liu et al. |

FOREIGN PATENT DOCUMENTS

| | | |
|---|---|---|
| CN | 103139115 A | 6/2013 |
| CN | 103200140 A | 7/2013 |
| CN | 103297069 A | 9/2013 |
| CN | 103580720 A | 2/2014 |
| CN | 103685098 A | 3/2014 |
| CN | 103701480 A | 4/2014 |
| EP | 3068055 A1 | 9/2016 |
| JP | 10190361 A | 7/1998 |
| JP | 2001196994 A | 7/2001 |
| JP | 2013532447 A | 8/2013 |
| KR | 19990060622 A | 7/1999 |
| KR | 20000009734 U | 6/2000 |
| KR | 20130061326 A | 6/2013 |
| RU | 2005141504 A | 8/2006 |
| SU | 675382 A1 | 7/1979 |
| WO | 2004107596 A1 | 12/2004 |
| WO | 2009114638 A1 | 9/2009 |
| WO | 2014036930 A1 | 3/2014 |
| WO | 2014061443 A1 | 4/2014 |
| WO | 2014108098 A1 | 7/2014 |
| WO | 2015048678 A1 | 4/2015 |

OTHER PUBLICATIONS

Mayank Jain et al., "Practical, Real-time, Full Duplex Wireless," 2011 ACM, Las Vegas, Nevada, USA, Sep. 19-23, 2011, 12 pages.
Tang Youxi, "Co-frequency Co-time Full Duplex Test Bed," National Communication Lab and University of Electronic Science and Technology of China, May 28, 2013, 27 pages.
Dinesh Bharadia et al., "Full Duplex Radios," Hong Kong, China, Aug. 12-16, 2013, 12 pages.
Dinesh Bharadia et al., "Full Duplex MIMO Radios," 2014, pp. 1-13.
Melissa Duarte et al., "Design and Characterization of a Full-Duplex Multiantenna System for WiFi Networks," IEEE, Mar. 2014, pp. 1160-1177.
International Search Report (including English translation) issued in corresponding International Application No. PCT/CN2014/080800, dated Mar. 27, 2015, 6 pages.
Extended European Search Report issued in corresponding European Application No. 14895776, dated May 16, 2017, 8 pages.
Office Action (including English translation) issued in corresponding Japanese Patent Application No. 2016-575088, dated Dec. 26, 2017, 8 pages.
Extended European search report issued in corresponding European Application No. 14895760.8, dated Jun. 9, 2017, 7 pages.
International Search Report (including English translation) issued in corresponding International Application No. PCT/CN2014/080870, dated Feb. 27, 2015, 6 pages.
Singaporean Search Report issued in corresponding Singaporean Patent Application No. 11201610769Y, dated Aug. 22, 2017, 2 pages.
Office Action issued in corresponding U.S. Appl. No. 15/388,968, dated May 12, 2017, 15 pages.
Extended European search report issued in corresponding European Application No. 14895770.7, dated May 19, 2017, 4 pages.
International Search Report (including English translation) issued in corresponding International Application No. PCT/CN2014/080864, dated Mar. 27, 2015, 6 pages.

METHODS AND APPARATUSES FOR INTERFERENCE CANCELLATION

CROSS-REFERENCE TO RELATED APPLICATION

This application is a continuation of International Application No. PCT/CN2014/080800, filed on Jun. 26, 2014, the disclosure of which is hereby incorporated by reference in its entirety.

TECHNICAL FIELD

Embodiments of the present disclosure relate to the field of communications technologies, and in particular, to an interference cancellation apparatus and method.

BACKGROUND

In a wireless communications system such as a mobile cellular communications system, a wireless local area network (WLAN), or a fixed wireless access (FWA) system, communications nodes such as a base station (BS, Base Station) or an access point (AP), a relay station (RS), and user equipment (UE) are generally capable of transmitting their own signals and receiving signals from other communications nodes. Because a radio signal is attenuated greatly in a radio channel, in comparison with a transmit signal of a local end, a signal coming from a communications peer becomes very weak when the signal arrives at a receive end. For example, a difference between transmit power and receive power of a communications node in a mobile cellular communications system may be up to 80 dB to 140 dB or even greater. Therefore, to avoid self-interference caused by a transmit signal of a transceiver to a receive signal of the transceiver, radio signal transmission and reception are generally differentiated by using different frequency bands or different time periods. For example, in a frequency division duplex (FDD) system, for transmission and reception, communication is performed by using different frequency bands separated by a guard band; in a time division duplex (TDD) system, for transmission and reception, communication is performed by using different time periods separated by a guard interval, where the guard band in the FDD system and the guard interval in the TDD system are both used to ensure that reception and transmission are fully isolated and to avoid interference caused by transmission to reception.

Different from the conventional FDD or TDD technology, a wireless full duplex technology may implement operations of reception and transmission simultaneously on a same radio channel. In this way, spectral efficiency of the wireless full duplex technology is theoretically twice that of the FDD or TDD technology. Apparently, a precondition for implementing wireless full duplex lies in that strong interference (referred to as self-interference, Self-interference) caused by a transmit signal of a transceiver to a receive signal of the transceiver is avoided, reduced, or canceled as much as possible, so that no adverse impact is caused to proper reception of a wanted signal.

FIG. 1 is a schematic block diagram of an interference suppression principle of a conventional wireless full duplex system. A digital-to-analog converter (DAC), an up converter, and a power amplifier in a transmit channel, and a low noise amplifier (LNA), a down converter, and an analog-to-digital converter (ADC) in a receive channel, and the like are functional modules of an intermediate radio frequency unit in a conventional transceiver. Canceling self-interference caused by a transmit signal is implemented by a spatial interference suppression unit, a radio frequency front-end analog interference cancellation module, a digital interference cancellation module, and the like that are shown in the figure.

Strength of a self-interference signal in a receive signal that undergoes spatial interference suppression is still far higher than that of a wanted signal, which causes blocking of front-end modules such as an LNA of a receiver. Therefore, before the LNA, the radio frequency front-end analog interference cancellation module uses a radio frequency signal coupled from a transmit-end power amplifier as a reference signal, and adjusts the reference signal by using estimated channel parameters such as an amplitude and a phase from a local transmit antenna to a local receive antenna, so that the reference signal approaches a self-interference signal component in a receive signal as much as possible. In this way, a local self-interference signal received by the receive antenna is canceled in an analog domain.

As shown in FIG. 1, in the conventional wireless full duplex system, radio frequency analog self-interference suppression is implemented before the LNA. In addition to a main-path self-interference signal component that is formed when the transmit signal arrives at the receive antenna after light-of-sight (LOS) propagation, the transmit signal also enters the receive antenna after being radiated by a scatterer during spatial propagation. Therefore, the self-interference signal further includes other components such as a near-field reflected self-interference signal and a far-field reflected self-interference signal.

FIG. 2 shows composition of a self-interference signal. As shown in FIG. 2, power of a far-field reflected self-interference signal component is very low, and does not have an adverse impact on a receive channel after an LNA, and therefore interference cancellation may be performed at a baseband by using a digital filter after an ADC. However, power of a near-field reflected self-interference signal component is relatively high, which may cause saturation of a receiver after the LNA.

Therefore, it is expected that a technology capable of canceling a near-field reflected self-interference component could be provided.

SUMMARY

Embodiments of the present disclosure provide an interference cancellation apparatus and method, which can cancel a near-field reflected self-interference component.

According to a first aspect, an interference cancellation apparatus is provided and includes: a main receive antenna and a divider. The main receive antenna is configured to receive a radio frequency receive signal, and transmit the radio frequency receive signal to a main-path self-interference canceller. The divider is configured to obtain a radio frequency reference signal generated according to a transmit signal, and transmit the radio frequency reference signal to the main-path self-interference canceller and a near-field reflected self-interference canceller. The main-path self-interference canceller is configured to receive the radio frequency reference signal transmitted by the divider and the radio frequency receive signal transmitted by the main receive antenna, and perform main-path interference cancellation on the radio frequency receive signal according to the radio frequency reference signal to obtain a first processed signal. The near-field reflected self-interference canceller is configured to receive the radio frequency reference signal transmitted by the divider and the first processed signal obtained by the main-path self-interference canceller, perform near-field reflected self-interference channel estimation according to a digital baseband reference signal corresponding to the radio frequency reference signal and according to a first digital signal obtained by sampling the first processed signal to obtain a near-field reflected self-interference component parameter, perform near-field reflected self-interference signal reconstruction according to the near-field reflected self-interference component parameter and the radio frequency reference signal to obtain a near-field reflected self-interference signal, and perform interference cancellation processing on the first processed signal according to the near-field reflected self-interference signal to obtain a second processed signal.

According to a second aspect, an interference cancellation method is provided. The method may include: obtaining a radio frequency reference signal generated according to a transmit signal; obtaining a radio frequency receive signal by using a main receive antenna; performing interference cancellation processing on the radio frequency receive signal according to the radio frequency reference signal to generate a first processed signal; performing near-field reflected self-interference channel estimation according to a digital baseband reference signal corresponding to the radio frequency reference signal and according to a first digital signal obtained by sampling the first processed signal to obtain a near-field reflected self-interference component parameter; performing near-field reflected self-interference signal reconstruction according to the near-field reflected self-interference component parameter and the radio frequency reference signal to obtain a near-field reflected self-interference signal; and performing interference cancellation processing on the first processed signal according to the near-field reflected self-interference signal to obtain a second processed signal.

BRIEF DESCRIPTION OF DRAWINGS

To describe the technical solutions in the embodiments of the present disclosure more clearly, the following briefly introduces the accompanying drawings required for describing the embodiments or the prior art. Apparently, the accompanying drawings in the following description show merely some embodiments of the present disclosure, and a person of ordinary skill in the art may still derive other drawings from these accompanying drawings without creative efforts.

REFERENCE SIGNS IN THE DRAWINGS

Figure 1:
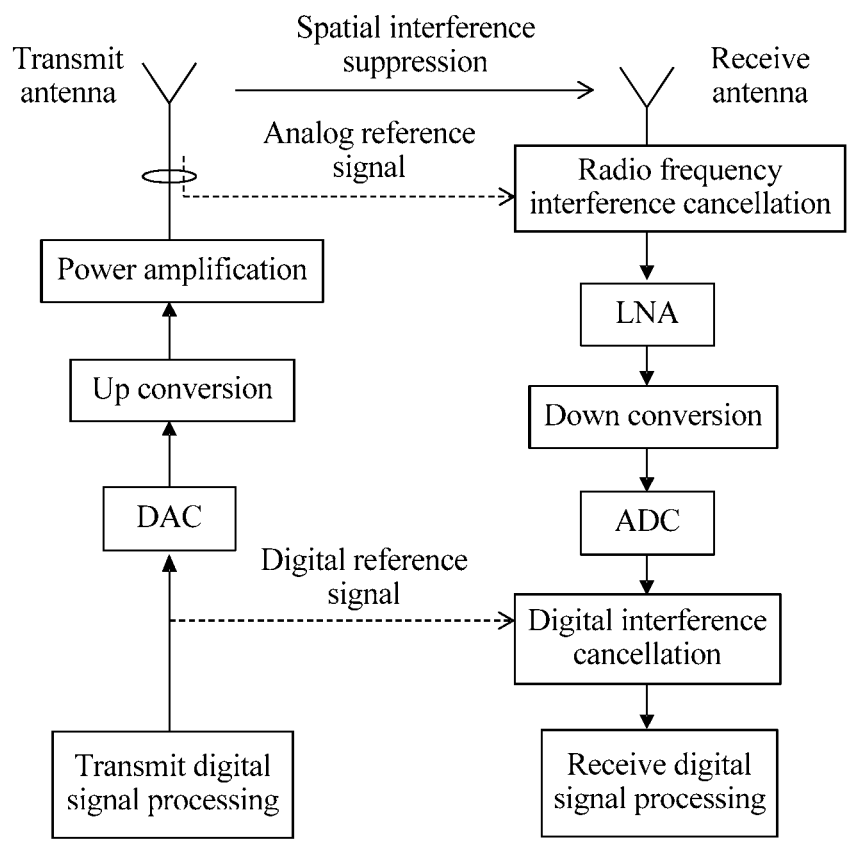
FIG. 1 is a schematic block diagram of an interference suppression principle of a conventional wireless full duplex system.
Figure 2:
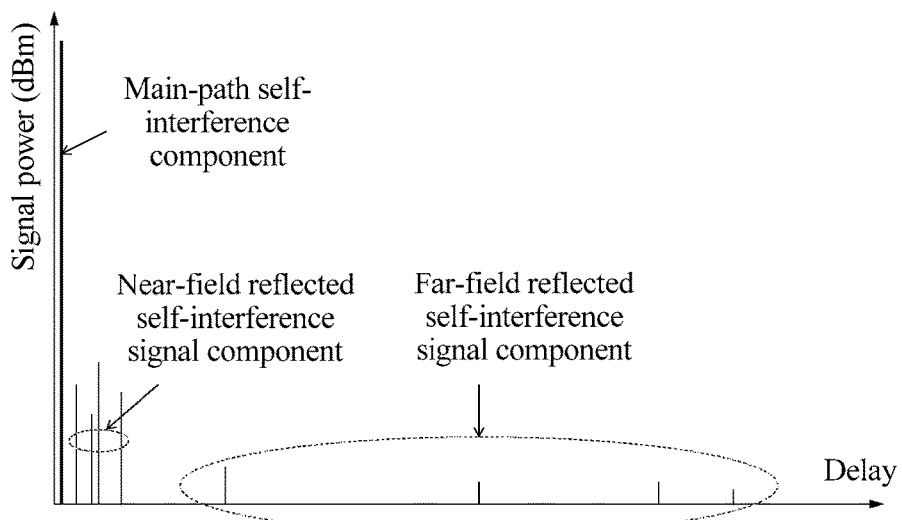
FIG. 2 is a schematic diagram of composition of a self-interference signal.

110—main receive antenna
120—divider
121—input end of the divider
122—first output end of the divider
123—second output end of the divider
130—main-path self-interference canceller
131—first input end of the main-path self-interference canceller
132—second input end of the main-path self-interference canceller
133—output end of the main-path self-interference canceller
140—near-field reflected self-interference canceller
141—first input end of the near-field reflected self-interference canceller
142—second input end of the near-field reflected self-interference canceller
143—output end of the near-field reflected self-interference canceller
1401—first analog-to-digital converter
1402—near-field reflected self-interference channel estimation module
1403—near-field reflected self-interference signal reconstruction module

DESCRIPTION OF EMBODIMENTS

With reference to the first aspect, in a first possible implementation manner, the near-field reflected self-interference canceller (140) includes:

a first analog-to-digital converter (1401), configured to receive the first processed signal obtained by the main-path self-interference canceller (130), perform digital sampling on the first processed signal to obtain the first digital signal, and transmit the first digital signal to a near-field reflected self-interference channel estimation module (1402);

the near-field reflected self-interference channel estimation module (1402), configured to receive the first digital signal transmitted by the first analog-to-digital converter (1401), obtain the digital baseband reference signal corresponding to the radio frequency reference signal, perform near-field reflected self-interference channel estimation according to the first digital signal and the digital baseband reference signal to obtain the near-field reflected self-interference component parameter, and transmit the near-field reflected self-interference component parameter to a near-field reflected self-interference signal reconstruction module (1403); and the near-field reflected self-interference signal reconstruction module (1403), configured to receive the near-field reflected self-interference component parameter obtained by the near-field reflected self-interference channel estimation module (1402) and the radio frequency reference signal transmitted by the divider (120), and perform near-field reflected self-interference signal reconstruction according to the near-field reflected self-interference component parameter and the radio frequency reference signal to obtain the near-field reflected self-interference signal.

With reference to the first possible implementation manner of the first aspect, in a second possible implementation manner, the first analog-to-digital converter (1401) is specifically configured to:

sample the first processed signal at a sampling rate $$T = \frac{P}{2f}$$

to obtain the first digital signal:

$$x(nT) = (-1)^n \left[ \sum_{k=1}^{K} c_k s_i(nT - \tau_k)\cos(\theta - 2\pi f \tau_k) + \sum_{k=1}^{K} c_k s_q(nT - \tau_k)\sin(\theta - 2\pi f \tau_k) \right];$$

where, f is a carrier frequency, θ is an initial phase, $s_i(t)$ and $s_q(t)$ are respectively I/Q components of a digital baseband reference signal $s_0(t)=s_i(t)+js_q(t)$, $c_k$ and $\tau_k$ respectively represent a signal amplitude and delay in each path, K is a total quantity of paths, and P is a positive integer.

With reference to the second possible implementation manner of the first aspect, in a third possible implementation manner, the near-field reflected self-interference channel estimation module (1402) is specifically configured to:

obtain linear equations in 2M unknowns according to the first digital signal:

$$\sum_{m=0}^{M} s_i(n-m)\cdot a_m + s_q(n-m)\cdot b_m = (-1)^n x(n), n = 0, 1, \ldots N, N \geq 2M;$$

and solve the linear equations in 2M unknowns by using a method of least squares, to obtain the near-field reflected self-interference component parameter, where the near-field reflected self-interference component parameter includes a first delay parameter $N_k=m$, a first amplitude and phase parameter $a_k$, and a second amplitude and phase parameter $b_k$.

With reference to the first possible implementation manner of the first aspect, in a fourth possible implementation manner, the near-field reflected self-interference canceller (140) further includes:

a second analog-to-digital converter (1404), configured to receive the radio frequency reference signal, and perform digital sampling on the radio frequency reference signal to obtain the digital baseband reference signal.

With reference to any one of the first to fourth possible implementation manners of the first aspect, in a fifth possible implementation manner, the near-field reflected self-interference canceller (140) further includes:

a first amplifier, where the first amplifier is configured to amplify the receive signal.

With reference to any one of the first to fourth possible implementation manners of the first aspect, in a sixth possible implementation manner, the near-field reflected self-interference canceller (140) further includes:

a second amplifier, configured to amplify the radio frequency reference signal transmitted to the near-field reflected self-interference signal reconstruction module; and a third amplifier, configured to amplify the first processed signal before interference cancellation processing is performed.

With reference to the first possible implementation manner of the first aspect, in a seventh possible implementation manner, the near-field reflected self-interference component parameter includes a first delay parameter, a first amplitude and phase parameter, and a second amplitude and phase parameter; and the near-field reflected self-interference signal reconstruction module (1403) includes a power divider, a first radio frequency selection switch, a first delayer group disposed between the power divider and the first radio frequency selection switch, a first amplitude and phase adjuster group, and a first combiner, where:

the power divider is configured to receive the radio frequency reference signal, and divide the radio frequency reference signal into at least one radio frequency reference signal;

the first delayer group includes at least one delayer, where each delayer is configured to perform delay processing on one radio frequency reference signal to form a delay signal of one radio frequency reference signal;

the first radio frequency selection switch is configured to receive the delay signal of the at least one radio frequency reference signal, and select, from delay signals of all radio frequency reference signals, a delay signal of at least one radio frequency reference signal according to the first delay parameter;

the first amplitude and phase adjuster group includes at least one amplitude and phase adjuster, where each amplitude and phase adjuster is configured to perform, according to the first amplitude and phase parameter and the second amplitude and phase parameter, amplitude and phase adjustment on a delay signal that is of one radio frequency reference signal and that is selected by the first radio frequency selection switch; and the first combiner is configured to combine delay signals of radio frequency reference signals after amplitude and phase adjustment, to generate the near-field reflected self-interference signal.

With reference to the first possible implementation manner of the first aspect, in an eighth possible implementation manner, the near-field reflected self-interference component parameter includes a first delay parameter, a first amplitude and phase parameter, and a second amplitude and phase parameter; and the near-field reflected self-interference signal reconstruction module (1403) includes:
at least a second delayer group, a second radio frequency selection switch, a second amplitude and phase adjuster group, and a second combiner, where:
the second delayer group includes at least one delayer, where the at least one delayer is connected in series, and the second delayer group is configured to receive the radio frequency reference signal, and perform delay processing on the radio frequency reference signal by using the at least one delayer sequentially, to form a delay signal of at least one radio frequency reference signal;
the second radio frequency selection switch is configured to receive the delay signal of the at least one radio frequency reference signal, and select, from delay signals of all radio frequency reference signals, a delay signal of at least one radio frequency reference signal according to the first delay parameter;
the second amplitude and phase adjuster group includes at least one amplitude and phase adjuster, where each amplitude and phase adjuster is configured to perform, according to the first amplitude and phase parameter and the second amplitude and phase parameter, amplitude and phase adjustment on a delay signal that is of one radio frequency reference signal and that is selected by the second radio frequency selection switch; and
the second combiner is configured to combine delay signals of radio frequency reference signals after amplitude and phase adjustment, to generate the near-field reflected self-interference signal.

With reference to the seventh or eighth possible implementation manner of the first aspect, in a ninth possible implementation manner, the amplitude and phase adjuster includes:
a power divider, a third delayer group, a radio frequency switch group, an attenuator group, and a third combiner, where:
the power divider is configured to receive the delay signal that is of the radio frequency reference signal and that is selected by the radio frequency selection switch, and divide the selected delay signal of the radio frequency reference signal into four tributary signals;
the third delayer group includes three delayers, where the delayers are configured to perform delay processing on any three of the four tributary signals;
the radio frequency switch group includes two radio frequency selection switches, where one radio frequency selection switch is configured to select one tributary signal from two tributary signals according to the first amplitude and phase parameter after delay processing is performed on the any three tributary signals, and the other radio frequency switch is configured to select one tributary signal from the other two tributary signals according to the second amplitude and phase parameter after delay processing is performed on the any three tributary signals;
the attenuator group includes two attenuators, where the attenuators are configured to perform amplitude adjustment processing on the tributary signals selected by the radio frequency switch group; and
the third combiner is configured to combine the tributary signals after amplitude adjustment processing, to form an amplitude- or phase-adjusted delay signal of the radio frequency reference signal.

With reference to the seventh or eighth possible implementation manner of the first aspect, in a tenth possible implementation manner, the amplitude and phase adjuster includes an attenuator and a phase shifter, where:
the attenuator is configured to perform, according to the first amplitude and phase parameter and the second amplitude and phase parameter, amplitude adjustment processing on the received delay signal that is of the radio frequency reference signal and that is transmitted by the radio frequency selection switch; and
the phase shifter is configured to perform, according to the first amplitude and phase parameter and the second amplitude and phase parameter, phase shift processing on a delay signal that is of the radio frequency reference signal and that is obtained after amplitude adjustment processing is performed by the attenuator.

With reference to the first aspect or any possible implementation manner of the first aspect, in an eleventh possible implementation manner,
the main-path self-interference canceller (130) is specifically configured to perform, based on the radio frequency receive signal, delay processing, amplitude adjustment processing, and phase adjustment processing on the radio frequency reference signal, so that an amplitude of the radio frequency reference signal is in a direction opposite or approximately opposite to an amplitude of a main-path self-interference signal in the radio frequency receive signal, and that a phase of the radio frequency reference signal is the same or approximately the same as a phase of the main-path self-interference signal in the radio frequency receive signal; or
perform, based on the radio frequency receive signal, delay processing, amplitude adjustment processing, and phase adjustment processing on the radio frequency reference signal, so that an amplitude of the radio frequency reference signal is the same or approximately the same as an amplitude of a main-path self-interference signal in the radio frequency receive signal, and that a difference between a phase of the radio frequency reference signal and a phase of the main-path self-interference signal in the radio frequency receive signal is 180 degrees or approximately 180 degrees.

With reference to the first aspect or any possible implementation manner of the first aspect, in a twelfth possible implementation manner, the transmit signal includes a near-field reflection channel detection timeslot and a data transmission timeslot that are disposed at an interval.

With reference to the second aspect, in a first possible implementation manner, obtaining the first digital signal by sampling the first processed signal specifically includes:
sampling the first processed signal at a sampling rate $$T = \frac{P}{2f}$$

to obtain the first digital signal:

$$x(nT) = (-1)^n \left[ \sum_{k=1}^{K} c_k s_i(nT - \tau_k)\cos(\theta - 2\pi f \tau_k) + \sum_{k=1}^{K} c_k s_q(nT - \tau_k)\sin(\theta - 2\pi f \tau_k) \right];$$

where, f is a carrier frequency, θ is an initial phase, $s_i(t)$ and $s_q(t)$ are respectively I/Q components of a digital baseband reference signal $s_0(t)=s_i(t)+js_q(t)$ $c_k$ and $\tau_k$ respectively represent a signal amplitude and delay in each path, K is a total quantity of paths, and P is a positive integer.

With reference to the first possible implementation manner of the second aspect, in a second possible implementation manner, the performing near-field reflected self-interference channel estimation according to a digital baseband reference signal corresponding to the radio frequency reference signal and according to a first digital signal obtained by sampling the first processed signal to obtain a near-field reflected self-interference component parameter is specifically:

obtaining linear equations in 2M unknowns according to the first digital signal:

$$\sum_{m=0}^{M} s_i(n-m) \cdot a_m + s_q(n-m) \cdot b_m = (-1)^n x(n), n = 0, 1, \ldots N, N \geq 2M;$$

and solving the linear equations in 2M unknowns by using a method of least squares, to obtain the near-field reflected self-interference component parameter, where the near-field reflected self-interference component parameter includes a first delay parameter $N_k=m$, a first amplitude and phase parameter $a_k$, and a second amplitude and phase parameter $b_k$.

With reference to the second aspect, in a third possible implementation manner, before the performing near-field reflected self-interference channel estimation according to a digital baseband reference signal corresponding to the radio frequency reference signal and according to a first digital signal obtained by sampling the first processed signal to obtain a near-field reflected self-interference component parameter, the method further includes: performing digital sampling on the radio frequency reference signal to obtain the digital baseband reference signal.

With reference to the second aspect or the first or second or third possible implementation manner, in a fourth possible implementation manner, after the performing interference cancellation processing on the first processed signal according to the near-field reflected self-interference signal to obtain a second processed signal, the method further includes: amplifying the second processed signal.

With reference to the second aspect or the first or second or third possible implementation manner, in a fifth possible implementation manner, before the performing near-field reflected self-interference signal reconstruction according to the near-field reflected self-interference component parameter and the radio frequency reference signal to obtain a near-field reflected self-interference signal, the method further includes: amplifying the radio frequency reference signal, so as to perform near-field reflected self-interference signal reconstruction according to the near-field reflected self-interference component parameter and the amplified radio frequency reference signal to obtain the near-field reflected self-interference signal; and before the performing interference cancellation processing on the first processed signal according to the near-field reflected self-interference signal to obtain a second processed signal, the method further includes: amplifying the first processed signal, so as to perform interference cancellation processing on the amplified first processed signal according to the near-field reflected self-interference signal to obtain the second processed signal.

With reference to the second aspect, in a sixth possible implementation manner, the near-field reflected self-interference component parameter includes a first delay parameter, a first amplitude and phase parameter, and a second amplitude and phase parameter; and the performing near-field reflected self-interference signal reconstruction according to the near-field reflected self-interference component parameter and the radio frequency reference signal to obtain a near-field reflected self-interference signal includes:

dividing the radio frequency reference signal into at least one radio frequency reference signal, and performing delay processing on each radio frequency reference signal to form a delay signal of at least one radio frequency reference signal;

selecting, from delay signals of all radio frequency reference signals, a delay signal of at least one radio frequency reference signal according to the first delay parameter;

performing, according to the first amplitude and phase parameter and the second amplitude and phase parameter, amplitude and phase adjustment on the selected delay signal of the at least one radio frequency reference signal; and combining delay signals of radio frequency reference signals after amplitude and phase adjustment, to generate the near-field reflected self-interference signal.

With reference to the second aspect, in a seventh possible implementation manner, the near-field reflected self-interference component parameter includes a first delay parameter, a first amplitude and phase parameter, and a second amplitude and phase parameter; and the performing near-field reflected self-interference signal reconstruction according to the near-field reflected self-interference component parameter and the radio frequency reference signal to obtain a near-field reflected self-interference signal includes:

performing delay processing on the radio frequency reference signal for at least one time, to form a delay signal of at least one radio frequency reference signal;

selecting, from delay signals of all radio frequency reference signals, a delay signal of at least one radio frequency reference signal according to the first delay parameter;

performing, according to the first amplitude and phase parameter and the second amplitude and phase parameter, amplitude and phase adjustment on the selected delay signal of the at least one radio frequency reference signal; and combining delay signals of radio frequency reference signals after amplitude and phase adjustment, to generate the near-field reflected self-interference signal.

With reference to the sixth or seventh possible implementation manner of the second aspect, in an eighth possible implementation manner, the performing, according to the first amplitude and phase parameter and the second amplitude and phase parameter, amplitude and phase adjustment on the selected delay signal of the at least one radio frequency reference signal includes:

dividing the delay signal of one radio frequency reference signal into four tributary signals;

performing delay processing on any three of the four tributary signals;

selecting one tributary signal from two tributary signals according to the first amplitude and phase parameter after delay processing is performed on the any three tributary signals, and performing amplitude adjustment processing;

selecting one tributary signal from the other two tributary signals according to the second amplitude and phase parameter, and performing amplitude adjustment processing; and combining the tributary signals after attenuation processing, to form an amplitude- or phase-adjusted delay signal of the radio frequency reference signal.

With reference to the sixth or seventh possible implementation manner of the second aspect, in a ninth possible implementation manner, the performing, according to the first amplitude and phase parameter and the second amplitude and phase parameter, amplitude and phase adjustment on the selected delay signal of the radio frequency reference signal includes:

performing, according to the first amplitude and phase parameter and the second amplitude and phase parameter, amplitude adjustment processing on the delay signal of the radio frequency reference signal; and performing, according to the first amplitude and phase parameter and the second amplitude and phase parameter, phase shift processing on a delay signal that is of the radio frequency reference signal and that is obtained after amplitude adjustment processing is performed.

With reference to the second aspect or any possible implementation manner of the second aspect, in a tenth possible implementation manner, the performing interference cancellation processing on the radio frequency receive signal according to the radio frequency reference signal includes:

performing, based on the radio frequency receive signal, delay processing, amplitude adjustment processing, and phase adjustment processing on the radio frequency reference signal, so that an amplitude of the radio frequency reference signal is in a direction opposite or approximately opposite to an amplitude of a main-path self-interference signal in the radio frequency receive signal, and that a phase of the radio frequency reference signal is the same or approximately the same as a phase of the main-path self-interference signal in the radio frequency receive signal; or performing, based on the radio frequency receive signal, delay processing, amplitude adjustment processing, and phase adjustment processing on the radio frequency reference signal, so that an amplitude of the radio frequency reference signal is the same or approximately the same as an amplitude of a main-path self-interference signal in the radio frequency receive signal, and that a difference between a phase of the radio frequency reference signal and a phase of the main-path self-interference signal in the radio frequency receive signal is 180 degrees or approximately 180 degrees.

With reference to the second aspect or any possible implementation manner of the second aspect, in an eleventh possible implementation manner, the transmit signal includes a near-field reflection channel detection timeslot and a data transmission timeslot that are disposed at an interval.

According to the interference cancellation apparatus and method provided in the embodiments of the present disclosure, for a radio frequency receive signal obtained by a main receive antenna, interference cancellation processing is performed according to a radio frequency reference signal to cancel a main-path self-interference signal component in the radio frequency receive signal; and for a radio frequency receive signal obtained after the main-path self-interference signal component is canceled, near-field reflected self-interference cancellation processing is performed by means of near-field reflected self-interference channel estimation and near-field reflected self-interference signal reconstruction. In this way, a near-field reflected self-interference component in the radio frequency receive signal can be canceled.

Multiple embodiments are described with reference to the accompanying drawings, and same parts in this specification are indicated by a same reference sign. In the following description, for ease of explanation, many specific details are provided to facilitate comprehensive understanding of one or more embodiments. However, apparently, the embodiments may also not be implemented by using these specific details. In other examples, a well-known structure and device are shown in a form of block diagrams, to conveniently describe one or more embodiments.

Terminologies such as "part", "module", and "system" used in this specification are used to indicate computer-related entities, hardware, firmware, combinations of hardware and software, software, or software being executed. For example, a part may be, but is not limited to, a process that runs on a processor, a processor, an object, an executable file, a thread of execution, a program, and/or a computer. As shown in figures, both a computing device and an application that runs on a computing device may be parts. One or more parts may reside within a process and/or a thread of execution, and a part may be located on one computer and/or distributed between two or more computers. In addition, these parts may be executed from various computer-readable media that store various data structures. For example, the parts may communicate by using a local and/or remote process and according to, for example, a signal having one or more data packets (for example, data from two parts interacting with another part in a local system, a distributed system, and/or across a network such as the Internet interacting with other systems by using the signal).

An interference cancellation apparatus according to an embodiment of the present disclosure may be disposed in an access terminal that uses a wireless full duplex technology, or itself may be an access terminal that uses a wireless full duplex technology. An access terminal may also be referred to as a system, a subscriber unit, a subscriber station, a mobile station, a mobile terminal, a remote station, a remote terminal, a mobile device, a user terminal, a terminal, a wireless communications device, user agent, a user apparatus, or user equipment (UE, User Equipment). The access terminal may be a cellular phone, a cordless phone, a SIP (Session Initiation Protocol, Session Initiation Protocol) phone, a WLL (Wireless Local Loop, wireless local loop) station, a PDA (Personal Digital Assistant, personal digital assistant), a handheld device having a wireless communication function, an in-vehicle device, a wearable device, a computing device, or another processing device connected to a wireless modem.

In addition, the interference cancellation apparatus according to the embodiment of the present disclosure may also be disposed in a base station that uses the wireless full duplex technology, or itself may be a base station that uses the wireless full duplex technology. The base station may be configured to communicate with a mobile device. The base station may be an AP (Access Point, access point) of Wi-Fi, or a BTS (Base Transceiver Station, base transceiver station) in a GSM (Global System for Mobile Communications, Global System for Mobile Communications) or a CDMA (Code Division Multiple Access, Code Division Multiple Access) system, or may be an NB (NodeB, NodeB) in a WCDMA (Wideband Code Division Multiple Access, Wideband Code Division Multiple Access) system, or may be an eNB or an eNodeB (evolved NodeB, evolved NodeB) in an LTE (Long Term Evolution, Long Term Evolution) system, or a relay station or an access point, or a base station device in a future 5G network, or the like.

In addition, aspects or features of the present disclosure may be implemented as an apparatus or a product that uses standard programming and/or engineering technologies. The term "product" used in this application covers a computer program that can be accessed from any computer-readable part, carrier or medium. For example, the computer-readable medium may include but is not limited to: a magnetic storage part (for example, a hard disk, a floppy disk or a magnetic tape), an optical disc (for example, a CD (Compact Disk, compact disk), a DVD (Digital Versatile Disk, digital versatile disk), a smart card and a flash memory part (for example, EPROM (Erasable Programmable Read-Only Memory, erasable programmable read-only memory), a card, a stick, or a key drive). In addition, various storage media described in this specification may indicate one or more devices and/or other machine-readable media that is used to store information. The term "machine-readable media" may include but is not limited to a radio channel, and various other media that can store, include and/or carry an instruction and/or data.

It should be noted that in the embodiments of the present disclosure, interference cancellation may be canceling all interference components in a signal (including a main-path self-interference signal and a near-field reflected self-interference signal), or may be canceling some interference components in a signal (including a part of a main-path self-interference signal and a part of a near-field reflected self-interference signal).

Figure 3:
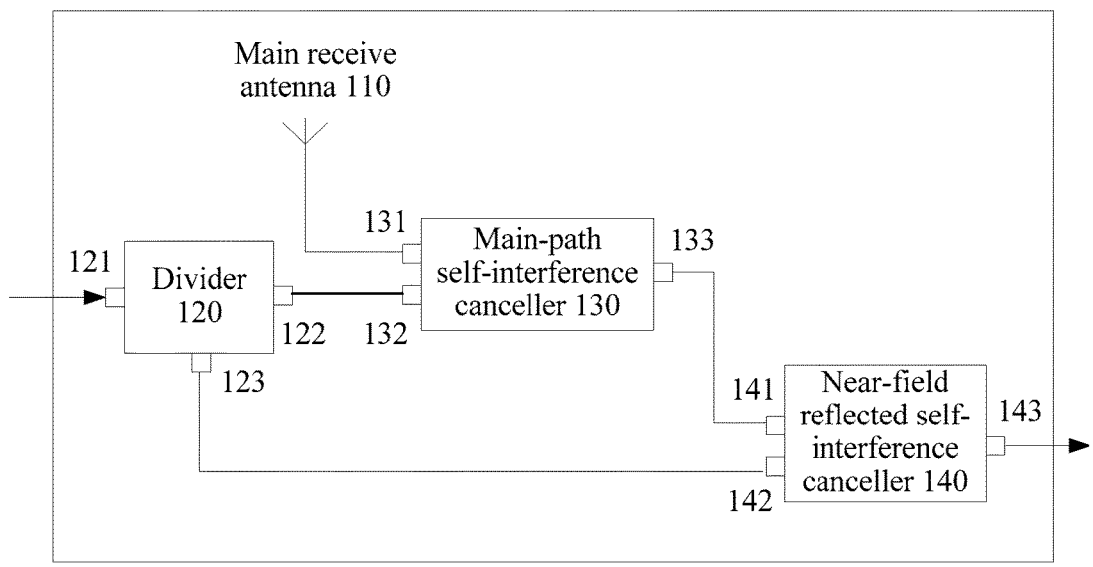
FIG. 3 is a schematic structural diagram of an interference cancellation apparatus according to an embodiment of the present disclosure.

FIG. 3 is a schematic structural diagram of an interference cancellation apparatus according to an embodiment of the present disclosure. As shown in FIG. 3, an apparatus 100 provided by this embodiment includes:

a main receive antenna 110, a divider 120, a main-path self-interference canceller 130, and a near-field reflected self-interference canceller 140, where: an output end of the main receive antenna 110 is connected to a first input end 131 of the main-path self-interference canceller 130; an input end 121 of the divider 120 is configured to obtain a radio frequency reference signal generated according to a transmit signal; a first output end 122 of the divider 120 is connected to a second input end 132 of the main-path self-interference canceller 130; an output end 133 of the main-path self-interference canceller 130 is connected to a first input end 141 of the near-field reflected self-interference canceller 140; a second output end 123 of the divider 120 is connected to a second input end 142 of the near-field reflected self-interference canceller 140; and an output end 143 of the near-field reflected self-interference canceller 140 outputs a second processed signal.

Functions of parts in the embodiment shown in FIG. 3 are described as follows:

The main receive antenna 110 is configured to receive a radio frequency receive signal, and transmit the radio frequency receive signal to the main-path self-interference canceller 130.

The divider 120 is configured to obtain a radio frequency reference signal generated according to a transmit signal, and transmit the radio frequency reference signal to the main-path self-interference canceller 130 and the near-field reflected self-interference canceller 140.

The main-path self-interference canceller 130 is configured to receive the radio frequency reference signal transmitted by the divider 120 and the radio frequency receive signal transmitted by the main receive antenna 110, and perform main-path interference cancellation on the radio frequency receive signal according to the radio frequency reference signal to obtain a first processed signal.

The near-field reflected self-interference canceller 140 is configured to receive the radio frequency reference signal transmitted by the divider 120 and the first processed signal obtained by the main-path self-interference canceller 130, perform near-field reflected self-interference channel estimation according to a digital baseband reference signal corresponding to the radio frequency reference signal and according to a first digital signal obtained by sampling the first processed signal to obtain a near-field reflected self-interference component parameter, perform near-field reflected self-interference signal reconstruction according to the near-field reflected self-interference component parameter and the radio frequency reference signal to generate a near-field reflected self-interference signal, and perform interference cancellation processing on the first processed signal according to the near-field reflected self-interference signal to obtain a second processed signal.

Connection relationships, structures, and functions of parts in the embodiment shown in FIG. 3 are described in detail as follows:

(1) Main Receive Antenna 110

The main receive antenna 110 is configured to receive a radio signal, and input the received radio signal as a radio frequency receive signal to the first input end 131 of the main-path self-interference canceller 130, where the process of receiving a radio signal by the main receive antenna 110 may be similar to the process of receiving a radio signal by an antenna in the prior art, and is not further described herein for avoiding repetition.

(2) Divider 120

Specifically, in the embodiment of the present disclosure, for example, a coupler or a power divider may be used as the divider 120.

In addition, because a radio frequency reference signal is obtained according to a transmit signal from a transmitter, for example, a transmit signal processed by a transmit digital signal processing module, a digital-to-analog conversion module, an up conversion module, and a power amplification module in FIG. 1 may be used as a radio frequency reference signal, and is input to the divider 120 through the input end 121 of the divider 120.

Therefore, the divider 120 can divide the radio frequency reference signal into two signals. One signal is transmitted to the second input end 132 of the main-path self-interference canceller 130 through the first output end 122 of the divider 120 and is received by the main-path self-interference canceller 130. The other signal is transmitted to the second input end 142 of the near-field reflected self-interference canceller 140 through the second output end 123 of the divider 120 and is received by the near-field reflected self-interference canceller 140.

The coupler or power divider is used as the divider 120 in such a manner that waveforms of the two signals output from the divider 120 can be consistent with that of the radio frequency reference signal, which is advantageous to subsequent interference cancellation based on the radio frequency reference signal.

It should be understood that the foregoing illustrated coupler and power divider that are used as the divider 120 are intended for exemplary description only, but the present disclosure is not limited thereto. All other apparatuses that can cause a similarity between a waveform of a reference signal and a waveform of a transmit signal to be in a preset range shall fall within the protection scope of the present disclosure.

It should be noted that in the embodiment of the present disclosure, power of the two signals that the radio frequency reference signal is divided into may be the same or may be different, which is not particularly limited by the present disclosure.

In addition, in the embodiment of the present disclosure, the process of processing the signal by the transmit digital signal processing module, the digital-to-analog conversion module, the up conversion module, and the power amplification module and the process of transmitting the transmit signal by a transmit antenna may be similar to those in the prior art. Herein for avoiding repetition, descriptions of the processes are omitted.

(3) Main-Path Self-Interference Canceller 130

Figure 4:
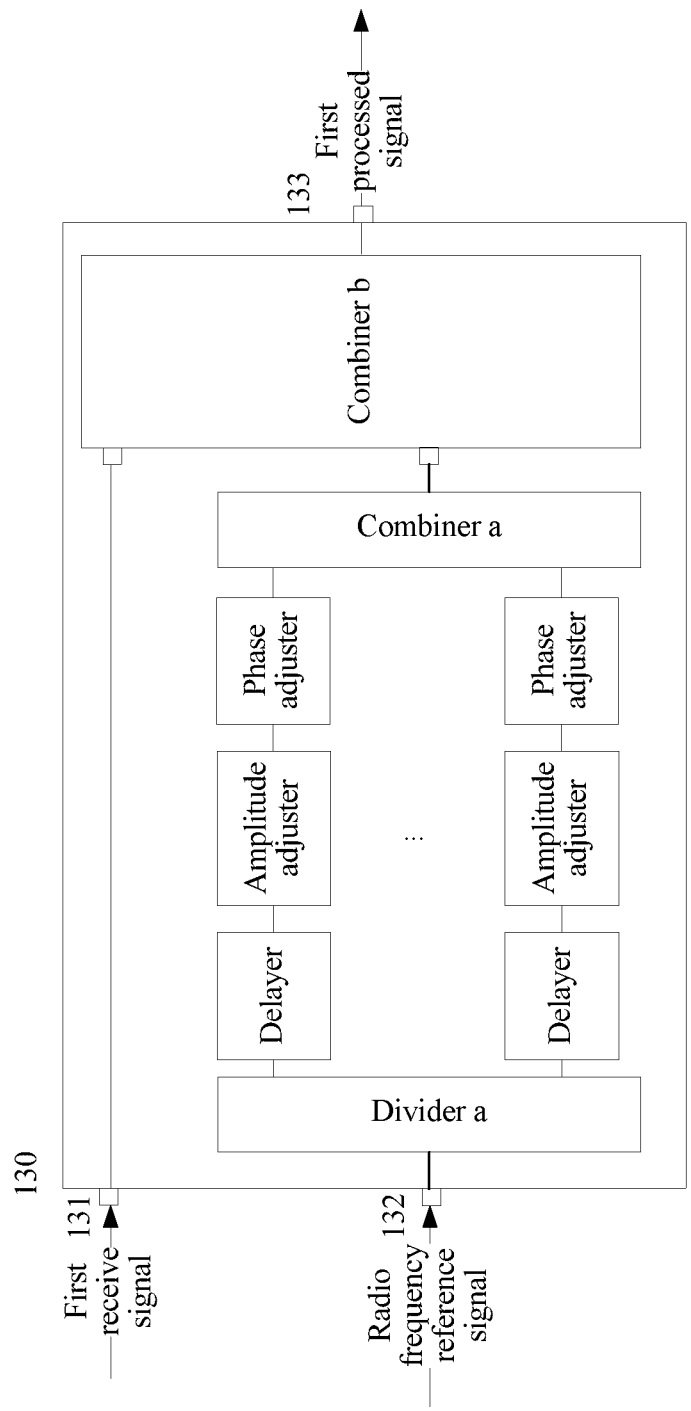
FIG. 4 is a schematic structural diagram of a main-path self-interference canceller according to an embodiment of the present disclosure.

Specifically, as shown in FIG. 4, in the embodiment of the present disclosure, the main-path self-interference canceller 130 may include a divider a, a combiner a, and a combiner b, where at least one transmission path constituted by at least one of a delayer, a phase adjuster, and an amplitude adjuster connected in series is included between the divider a and the combiner a, where an output end of the combiner a is connected to an input end of the combiner b. In the embodiment of the present disclosure, the main-path self-interference canceller 130 has two input ends. The divider a may be a power divider, and the combiner a and the combiner b may be couplers.

The first input end 131 (namely, an input port of the combiner b) of the main-path self-interference canceller 130 is connected to the output end of the main receive antenna 110, and is configured to obtain a radio frequency receive signal from the output end of the main receive antenna 110; the second input end 132 (namely, an input port of the divider a) of the main-path self-interference canceller 130 is connected to the first output end 122 of the divider 120, and is configured to receive one radio frequency reference signal from the divider 120.

Optionally, the main-path self-interference canceller 130 is specifically configured to perform, based on the radio frequency receive signal, delay processing, amplitude adjustment processing, and phase adjustment processing on the radio frequency reference signal, so that an amplitude of the radio frequency reference signal is in a direction opposite or approximately opposite to an amplitude of a main-path self-interference signal in the radio frequency receive signal, and that a phase of the radio frequency reference signal is the same or approximately the same as a phase of the main-path self-interference signal in the radio frequency receive signal; or perform, based on the radio frequency receive signal, delay processing, amplitude adjustment processing, and phase adjustment processing on the radio frequency reference signal, so that an amplitude of the radio frequency reference signal is the same or approximately the same as an amplitude of a main-path self-interference signal in the radio frequency receive signal, and that a difference between a phase of the radio frequency reference signal and a phase of the main-path self-interference signal in the radio frequency receive signal is 180 degrees or approximately 180 degrees; and combine radio frequency reference signals after delay processing, amplitude adjustment processing, and phase adjustment processing with the radio frequency receive signal.

Specifically, the second input end 132 of the main-path self-interference canceller 130 is connected to the first output end 122 of the divider 120, and a signal (namely, a radio frequency reference signal) output from the first output end 122 of the divider 120 is input through the second input end 132 of the main-path self-interference canceller 130 to the divider a, where the divider a may be a power divider. The divider a divides the radio frequency reference signal into several radio frequency reference signals (power of the several radio frequency reference signals may be the same or different). Using one of the several radio frequency reference signals as an example for description, an output end of the divider a outputs one radio frequency reference signal to an adjustment circuit constituted by a delayer, a phase adjuster, and an amplitude adjuster that are connected in series, where the adjustment circuit is configured to adjust a delay, an amplitude, and a phase of a signal by means of delaying, attenuation, phase shifting, and the like. For example, through attenuation, the amplitude of the radio frequency reference signal may approach an amplitude of a main-path self-interference signal component (namely, the main-path self-interference signal) in the radio frequency receive signal. Certainly, a best effect is that the amplitudes are the same. However, because an error exists in an actual application, the amplitudes may be adjusted to approximately the same. In addition, through delaying and/or through phase shifting, the difference between the phase of the radio frequency reference signal and the phase of the radio frequency receive signal (specifically, the main-path self-interference signal component in the radio frequency receive signal) may be adjusted to 180 degrees or approximately 180 degrees. For example, the range of approximately 180 degrees may include 170 to 190 degrees, or more preferably 175 to 185 degrees.

Alternatively, through attenuation, the amplitude of the radio frequency reference signal may be in a direction opposite to the amplitude of the main-path self-interference signal component in the radio frequency receive signal. Certainly, a best effect is that directions of the amplitudes are opposite. However, because an error exists in an actual application, the directions of the amplitudes may be adjusted to be approximately opposite. In addition, through delaying and/or through phase shifting, the phase of the radio frequency reference signal may be adjusted to be the same or approximately the same as the phase of the radio frequency receive signal (specifically, the main-path self-interference signal component in the radio frequency receive signal).

Dividing the radio frequency reference signal into multiple signals, only one signal by the divider is described above. Certainly, because the divider divides the radio frequency reference signal into multiple signals, and finally the signals are combined by the combiner a, the delay processing, amplitude adjustment processing, and phase adjustment processing may also be functions that occur on each tributary output by the divider, and finally, after combination, objectives of the delay processing, amplitude adjustment processing, and phase adjustment processing of the radio frequency reference signal input at the input end of the divider are achieved, that is, each tributary output by the divider may include at least one of a delayer, a phase adjuster, and an amplitude adjuster.

Certainly, the amplitude adjustment may be expressed as attenuation or gain, and only attenuation is used as an example for description in the foregoing embodiment. In addition, in the embodiment of the present disclosure, "approximately" may indicate that a similarity between two is within a preset range, where the preset range may be determined at random according to actual use and requirements, and is not particularly limited by the present disclosure. For avoiding repetition, the following omits descriptions of similarities unless otherwise specified.

Afterward, radio frequency reference signals of all tributaries output by the divider a are combined by the combiner a after the amplitude and phase adjustment, and the radio frequency reference signal is input to another input port of the combiner b. Therefore, the combiner b may combine the radio frequency receive signal with the radio frequency reference signal obtained after the amplitude and phase adjustment and combination (for example, add the radio frequency reference signal to the radio frequency receive signal or subtract the radio frequency reference signal from the radio frequency receive signal), to cancel the main-path self-interference signal component in the radio frequency receive signal, thereby implementing main-path interference cancellation processing for the radio frequency receive signal.

For illustration instead of limitation, in the embodiment of the present disclosure, the amplitude adjuster may be an attenuator. The phase adjuster may be a phase shifter. The delayer may be a delay line.

Therefore, the first processed signal output from the output end 133 (specifically, the output end of the combiner b) of the main-path self-interference canceller 130 is a signal generated by canceling the main-path self-interference signal component in the radio frequency receive signal.

It should be noted that in the embodiment of the present disclosure, the delayer, phase adjuster, and amplitude adjuster may be adjusted in a manner of minimizing strength of the first processed signal output by the combiner b, based on the output of the combiner b. In addition, the present disclosure is not limited to the foregoing implementation manner. As long as strength of the radio frequency receive signal can be reduced according to the radio frequency reference signal (or strength of the first processed signal is less than strength of the radio frequency receive signal), an interference cancellation effect can be achieved.

(4) Near-Field Reflected Self-Interference Canceller 140

Figure 5:
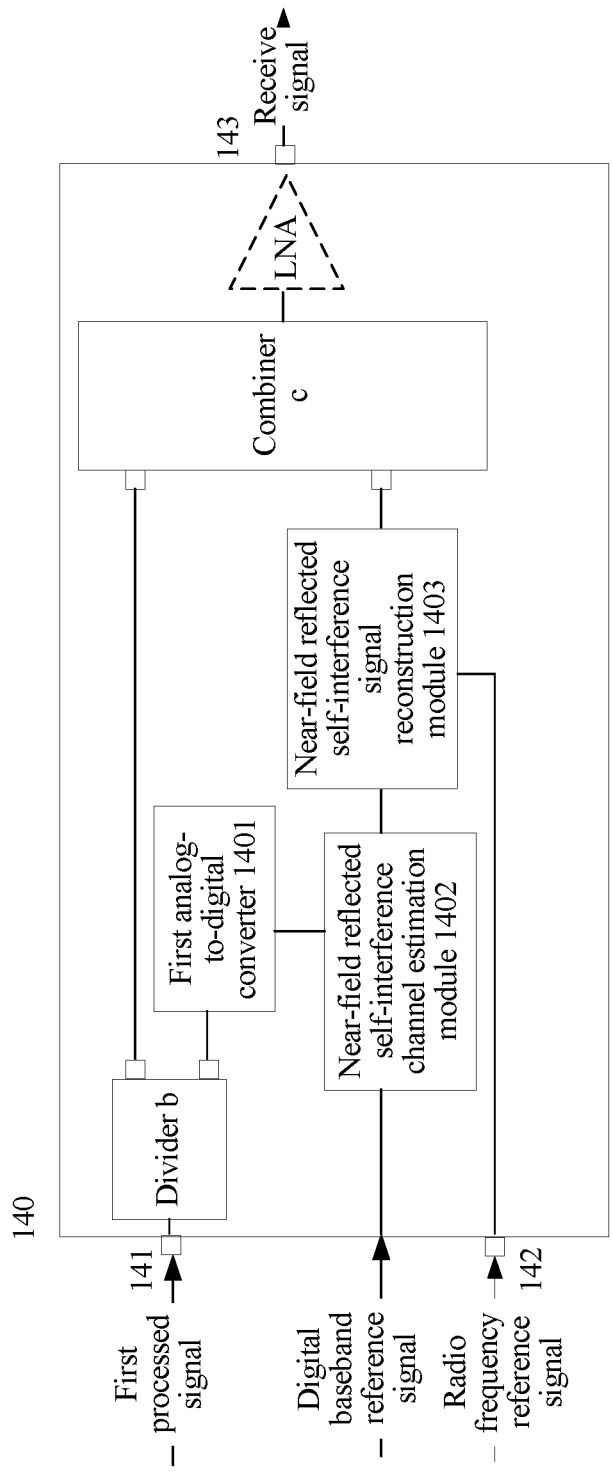
FIG. 5 is a schematic structural diagram of a near-field reflected self-interference canceller according to an embodiment of the present disclosure.

Specifically, as shown in FIG. 5, in the embodiment of the present disclosure, the near-field reflected self-interference canceller 140 may include a first analog-to-digital converter 1401, a near-field reflected self-interference channel estimation module 1402, and a near-field reflected self-interference signal reconstruction module 1403.

The first analog-to-digital converter 1401 is configured to receive the first processed signal obtained by the main-path self-interference canceller 130, perform digital sampling on the first processed signal to obtain the first digital signal, and transmit the first digital signal to the near-field reflected self-interference channel estimation module.

The near-field reflected self-interference channel estimation module 1402 is configured to receive the first digital signal transmitted by the first analog-to-digital converter 1401, obtain the digital baseband reference signal corresponding to the radio frequency reference signal, perform near-field reflected self-interference channel estimation according to the first digital signal and the digital baseband reference signal to obtain the near-field reflected self-interference component parameter, and transmit the near-field reflected self-interference component parameter to the near-field reflected self-interference signal reconstruction module.

The near-field reflected self-interference signal reconstruction module 1403 is configured to receive the near-field reflected self-interference component parameter obtained by the near-field reflected self-interference channel estimation module 1402 and the radio frequency reference signal transmitted by the divider 120, and perform near-field reflected self-interference signal reconstruction according to the near-field reflected self-interference component parameter and the radio frequency reference signal to obtain the near-field reflected self-interference signal.

The near-field reflected self-interference channel estimation module 1402 includes any one of a field-programmable gate array FPGA (Field-Programmable Gate Array), a central processing unit CPU (Central Processing Unit), or an application-specific integrated circuit ASIC (Application Specific Integrated Circuit). It may be understood that the near-field reflected self-interference canceller 140 further includes a divider b and a combiner c. An input end (used as the first input end 141 of the near-field reflected self-interference canceller 140) of the divider b is connected to the output end 133 of the main-path self-interference canceller 130, and is configured to receive the first processed signal generated by the main-path self-interference canceller 130. An input end of the first analog-to-digital converter 1401 is connected to an output end of the divider b. An input end of the near-field reflected self-interference channel estimation module 1402 is connected to an output end of the first analog-to-digital converter 1401. Another input end of the near-field reflected self-interference channel estimation module 1402 inputs the digital baseband reference signal corresponding to the radio frequency reference signal. An output end of the near-field reflected self-interference channel estimation module 1402 is connected to an input end of the near-field reflected self-interference signal reconstruction module 1403, and another input end (configured to obtain the radio frequency reference signal) of the near-field reflected self-interference signal reconstruction module 1403 is connected to the second output end 123 of the divider 120. An output end of the near-field reflected self-interference signal reconstruction module 1403 is connected to an input end of the combiner c, and another output end of the divider b is connected to another input end of the combiner c. An output end of the combiner c is used as an output end for outputting the second processed signal (namely, the output end 143 of the near-field reflected self-interference canceller 140).

Figure 6:
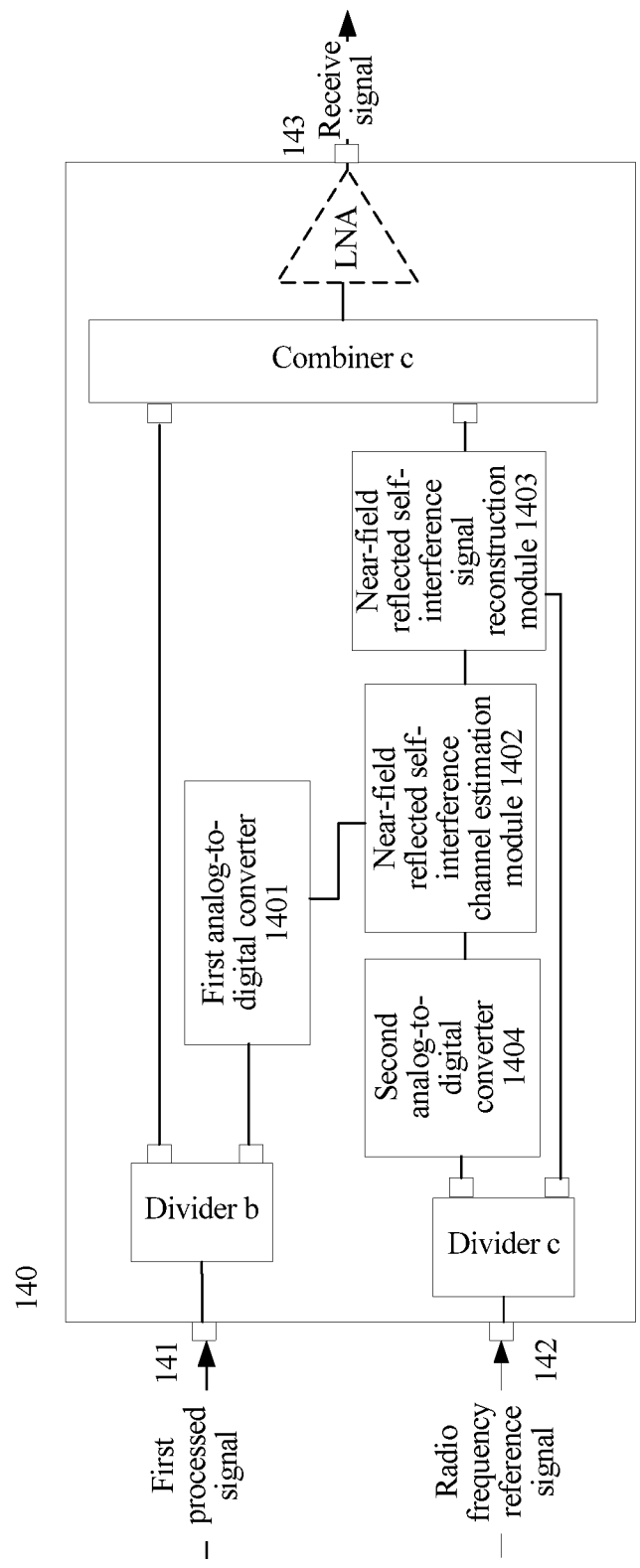
FIG. 6 is a schematic structural diagram of a near-field reflected self-interference canceller according to another embodiment of the present disclosure.

Herein, optionally, referring to FIG. 6, the near-field reflected self-interference canceller 140 further includes a second analog-to-digital converter 1404, configured to receive the radio frequency reference signal, and perform digital sampling on the radio frequency reference signal to obtain the digital baseband reference signal. The near-field reflected self-interference canceller 140 further includes a divider c. An input end of the divider c is connected to the second output end 123 of the divider 120, and an output end of the divider c is connected to another input end (namely, an input end for obtaining the digital baseband reference signal) of the near-field reflected self-interference channel estimation module 1402 through the second analog-to-digital converter 1404. Another output end of the divider c is connected to another input end of the near-field reflected self-interference signal reconstruction module 1403 (in this case, another input end of the near-field reflected self-interference signal reconstruction module 1403 is connected to the second output end 123 of the divider 120 indirectly to obtain the radio frequency reference signal).

Further, referring to FIG. 5, the near-field reflected self-interference canceller (140) further includes:

a first amplifier, where the first amplifier is configured to amplify the second processed signal. The first amplifier is disposed on a transmission line of the output end of the combiner c (in FIG. 5, an LNA is used as an example of the first amplifier). In this case, an output end of the low noise amplifier (LNA) is used as the output end 143 of the near-field reflected self-interference canceller (140). The first amplifier amplifies the second processed signal, which may reduce a requirement of a transmitter side on power of a radio frequency transmit signal.

Figure 7:
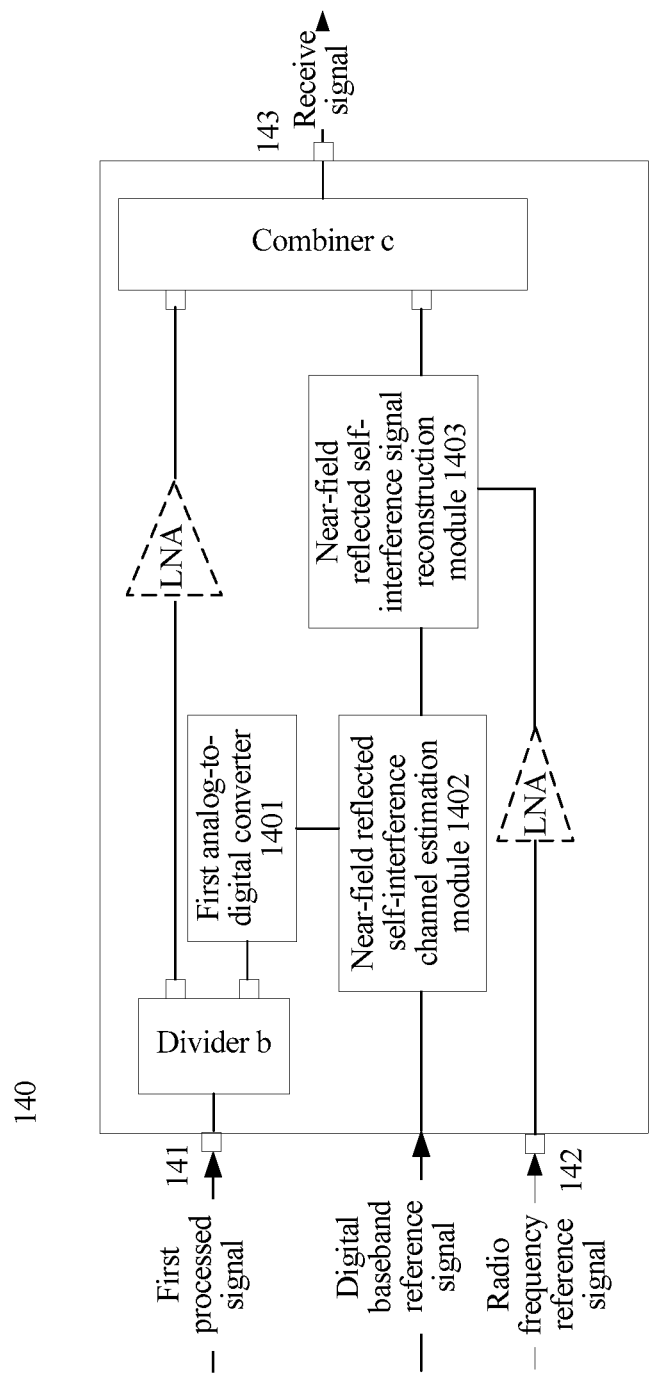
FIG. 7 is a schematic structural diagram of a near-field reflected self-interference canceller according to still another embodiment of the present disclosure.

In an optional manner, referring to FIG. 7, the near-field reflected self-interference canceller (140) further includes:

a second amplifier, configured to amplify the radio frequency reference signal transmitted to the near-field reflected self-interference signal reconstruction module; and a third amplifier, configured to amplify the first processed signal before interference cancellation processing is performed.

The second amplifier is disposed on a transmission line between the near-field reflected self-interference signal reconstruction module and the divider c. The third amplifier is disposed on a transmission line between the divider b and the combiner c (in FIG. 7, for example, both the second amplifier and the third amplifier are LNAs). The third amplifier amplifies the first processed signal before interference cancellation processing is performed, and the second amplifier amplifies the radio frequency reference signal that enters the near-field reflected self-interference signal reconstruction module. In this way, a requirement on power of the radio frequency reference signal may be reduced, and the requirement of the transmitter side on the power of the radio frequency transmit signal is further reduced. The near-field reflected self-interference canceller (140) corresponding to FIG. 6 may also be disposed in a manner of having two amplifiers, which specifically corresponds to a variation of FIG. 7 and is not further described herein.

Figure 8:
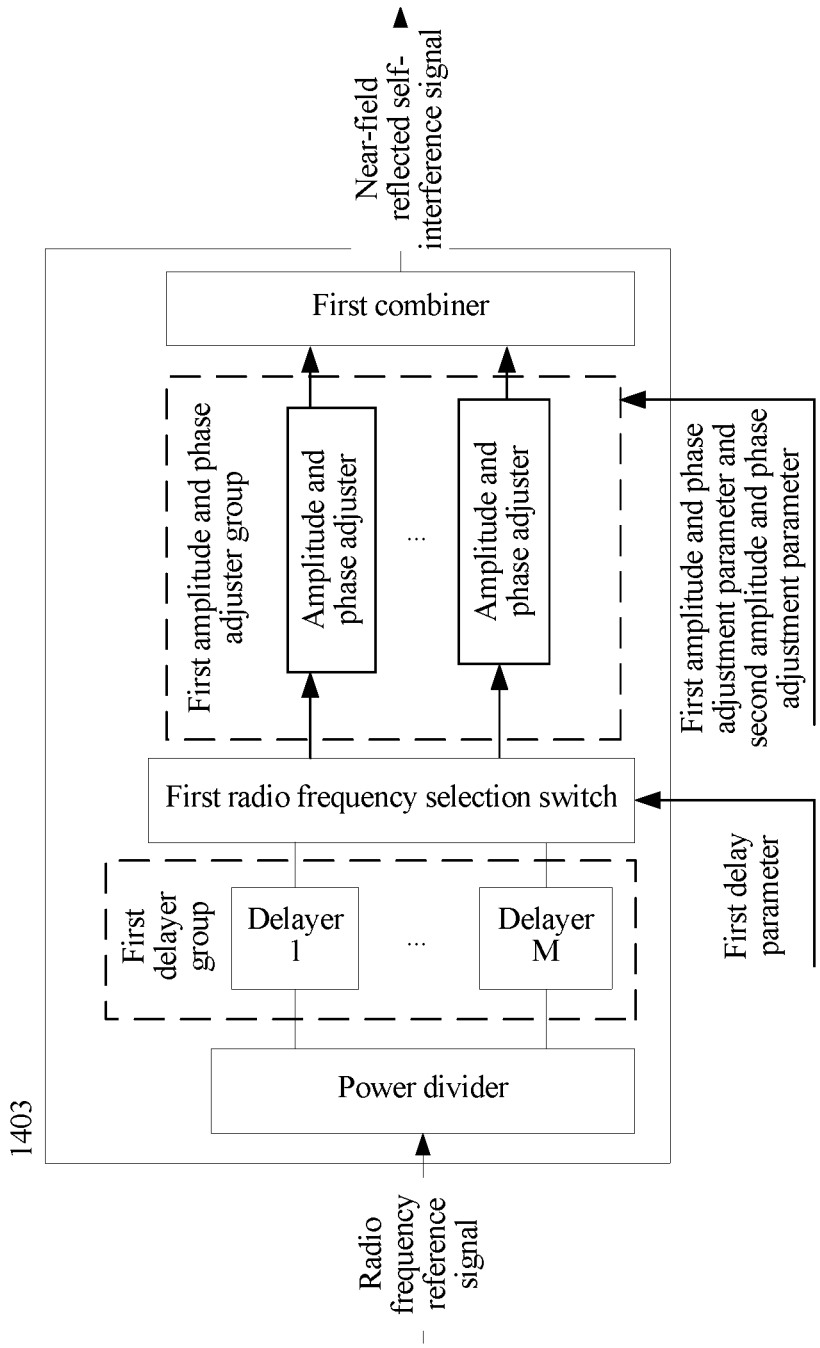
FIG. 8 is a schematic structural diagram of a near-field reflected self-interference signal reconstruction module according to an embodiment of the present disclosure.

Further, in an optional manner, the near-field reflected self-interference component parameter includes a first delay parameter, a first amplitude and phase parameter, and a second amplitude and phase parameter; and referring to FIG. 8, the near-field reflected self-interference signal reconstruction module 1403 includes a power divider, a first radio frequency selection switch, a first delayer group disposed between the power divider and the first radio frequency selection switch, a first amplitude and phase adjuster group, and a first combiner, where:

the power divider is configured to receive the radio frequency reference signal, and divide the radio frequency reference signal into at least one radio frequency reference signal;

the first delayer group includes at least one delayer, where each delayer is configured to perform delay processing on one radio frequency reference signal to form a delay signal of one radio frequency reference signal;

the first radio frequency selection switch is configured to receive the delay signal of the at least one radio frequency reference signal, and select, from delay signals of all radio frequency reference signals, a delay signal of at least one radio frequency reference signal according to the first delay parameter;

the first amplitude and phase adjuster group includes at least one amplitude and phase adjuster, where each amplitude and phase adjuster is configured to perform, according to the first amplitude and phase parameter and the second amplitude and phase parameter, amplitude and phase adjustment on a delay signal that is of one radio frequency reference signal and that is selected by the first radio frequency selection switch; and the first combiner is configured to combine delay signals of radio frequency reference signals after amplitude and phase adjustment, to generate the near-field reflected self-interference signal.

From the foregoing description, it may be understood that the power divider may divide the radio frequency reference signal into M signals. A quantity of delay taps that may be formed by M delayers included in the first delayer group is M. The first radio frequency selection switch may be an M-to-K radio frequency selection switch. That is, from delay signals of the received M radio frequency reference signals, delay signals of K radio frequency reference signals may be selected according to the first delay parameter and output.

Figure 9:
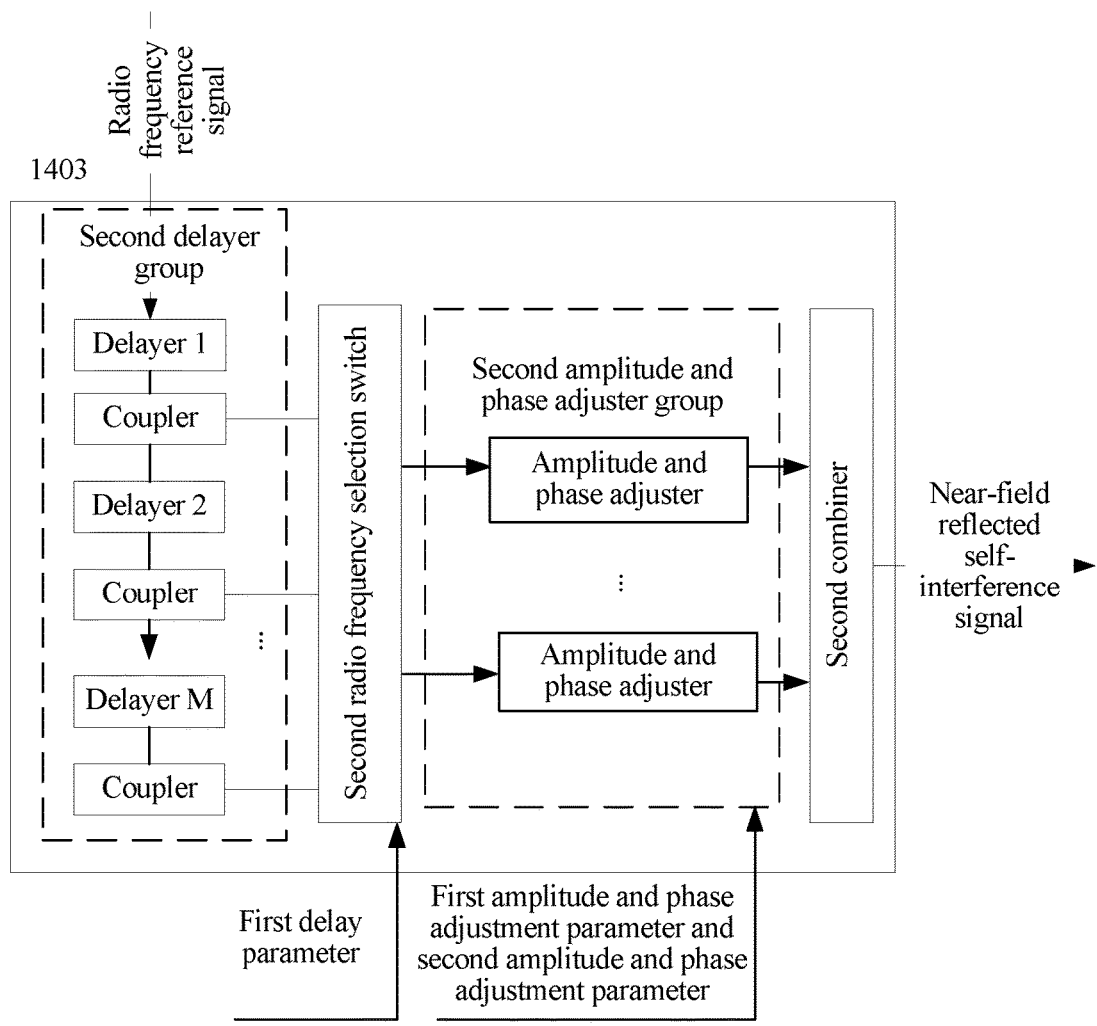
FIG. 9 is a schematic structural diagram of a near-field reflected self-interference signal reconstruction module according to another embodiment of the present disclosure.

Alternatively, referring to FIG. 9, the near-field reflected self-interference signal reconstruction module 1403 includes:

at least a second delayer group, a second radio frequency selection switch, a second amplitude and phase adjuster group, and a second combiner, where:

the second delayer group includes at least one delayer, where the at least one delayer is connected in series, and the second delayer group is configured to receive the radio frequency reference signal, and perform delay processing on the radio frequency reference signal by using the at least one delayer sequentially, to form a delay signal of at least one radio frequency reference signal;

the second radio frequency selection switch is configured to receive the delay signal of the at least one radio frequency reference signal, and select, from delay signals of all radio frequency reference signals, a delay signal of at least one radio frequency reference signal according to the first delay parameter;

the second amplitude and phase adjuster group includes at least one amplitude and phase adjuster, where each amplitude and phase adjuster is configured to perform, according to the first amplitude and phase parameter and the second amplitude and phase parameter, amplitude and phase adjustment on a delay signal that is of one radio frequency reference signal and that is selected by the second radio frequency selection switch; and the second combiner is configured to combine delay signals of radio frequency reference signals after amplitude and phase adjustment, to generate the near-field reflected self-interference signal.

In addition, with reference to FIG. 9 and in combination with the foregoing description, it may be understood that the delayers in the second delayer group are connected by couplers, and that a delay signal of a radio frequency reference signal, formed in each delay, is output by a coupler. That is, an output end of a previous delayer is connected to an input end of the coupler, an output end of the coupler is connected to an input end of the second radio frequency selection switch, and another output end of the coupler is connected to an input end of a next delayer (the previous and next are only intended for clearly describing a sequence of transferring the radio frequency reference signal in the second delayer group, and not for limiting the implementation manner of the present disclosure). The second delayer group may include M delayers configured to delay the radio frequency reference signal for M times and form delay signals of M radio frequency reference signals. A quantity of delay taps that may be formed by the M delayers included in the second delayer group is M. The second radio frequency selection switch may be an M-to-K radio frequency selection switch. That is, from delay signals of the received M radio frequency reference signals, delay signals of K radio frequency reference signals may be selected according to the first delay parameter and output.

Figure 10:
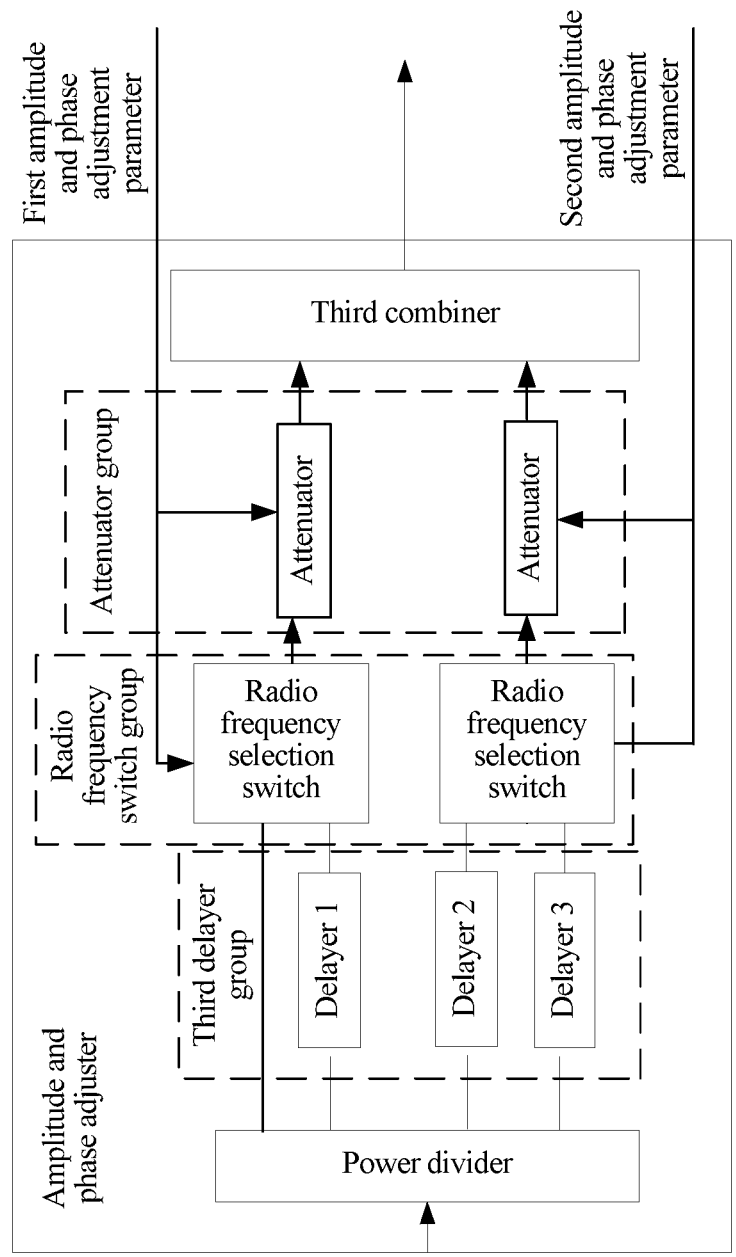
FIG. 10 is a schematic structural diagram of an amplitude and phase adjuster according to an embodiment of the present disclosure.

Further, the amplitude and phase adjuster may be implemented in at least the following two manners:

Referring to FIG. 10, in the first manner, the amplitude and phase adjuster includes:

a power divider, a third delayer group, a radio frequency switch group, an attenuator group, and a third combiner, where:

the power divider is configured to receive the delay signal that is of the radio frequency reference signal and that is selected by the radio frequency selection switch, and divide the selected delay signal of the radio frequency reference signal into four tributary signals;

the third delayer group includes three delayers, where the delayers are configured to perform delay processing on any three of the four tributary signals;

the radio frequency switch group includes two radio frequency selection switches, where one radio frequency selection switch is configured to select one tributary signal from two tributary signals according to the first amplitude and phase parameter after delay processing is performed on the any three tributary signals, and the other radio frequency switch is configured to select one tributary signal from the other two tributary signals according to the second amplitude and phase parameter after delay processing is performed on the any three tributary signals;

the attenuator group includes two attenuators, where the attenuators are configured to perform amplitude adjustment processing on the tributary signals selected by the radio frequency switch group; and the third combiner is configured to combine the tributary signals after amplitude adjustment processing, to form an amplitude- or phase-adjusted delay signal of the radio frequency reference signal.

Figure 11:
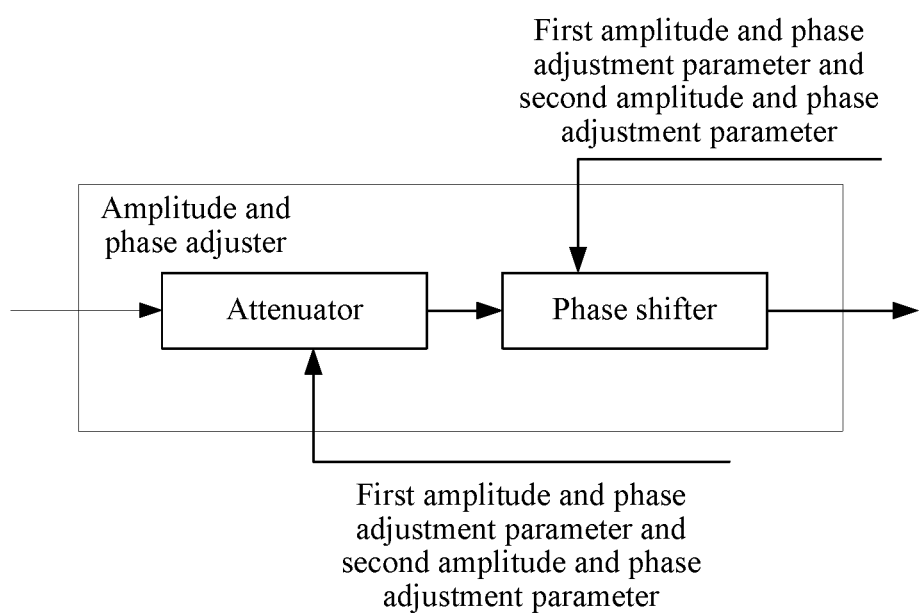
FIG. 11 is a schematic structural diagram of an amplitude and phase adjuster according to another embodiment of the present disclosure.

Referring to FIG. 11, in the second manner, the amplitude and phase adjuster includes an attenuator and a phase shifter, where:

the attenuator is configured to perform, according to the first amplitude and phase parameter and the second amplitude and phase parameter, amplitude adjustment processing on the received delay signal that is of the radio frequency reference signal and that is transmitted by the radio frequency selection switch; and the phase shifter is configured to perform, according to the first amplitude and phase parameter and the second amplitude and phase parameter, phase shift processing on a delay signal that is of the radio frequency reference signal and that is obtained after amplitude adjustment processing is performed by the attenuator.

The following describes a specific operating principle of the near-field reflected self-interference canceller 140. According to the description of the foregoing embodiment, further, the transmit signal includes a near-field reflection channel detection timeslot and a data transmission timeslot that are disposed at an interval. In the near-field reflection channel detection timeslot, a communications peer does not transmit a signal, and a signal received by a receiver includes only a self-interference signal. Because there is no signal from the communications peer, the receiver may perform near-field reflected self-interference channel estimation in the near-field reflection channel detection timeslot to obtain a near-field reflected self-interference component parameter, where the near-field reflected self-interference component parameter may include transmission path delay, phase, and amplitude parameters of a near-field reflected self-interference component. In the data transmission timeslot, a signal received by the receiver includes a self-interference signal and a data signal, and the receiver may reconstruct, in the data transmission timeslot, a near-field reflected self-interference signal according to the radio frequency reference signal and the near-field reflected self-interference component parameter.

The transmit signal of the communications peer may be expressed in the following formula:

$$s(t)=s_i(t)\cos(\omega t+\theta)+s_q(t)\sin(\omega t+\theta),$$

where, $\omega=2\pi f$, f is a carrier frequency, $\theta$ is an initial phase, and $s_i(t)$ and $s_q(t)$ are respectively I/Q (In-phase/Quadrature) components of a digital baseband reference signal $s_0(t)=s_i(t)+js_q(t)$; in the near-field reflection channel detection timeslot, the transmit signal includes only the near-field reflected self-interference signal, and the first processed signal may be expressed as the following multi-path delay signal:

$$x(t) = \sum_{k=1}^{K} c_k s_i(t-\tau_k)\cos(\omega t + \theta - 2\pi f \tau_k) + \sum_{k=1}^{K} c_k s_q(t-\tau_k)\sin(\omega t + \theta - 2\pi f \tau_k) \quad \text{formula (1)}$$

where, $c_k$ and $\tau_k$ respectively represent a signal amplitude and delay in each path, and K is a total quantity of paths. A radio frequency ADC (the first analog-to-digital converter) is used to sample, at a sampling rate $$T = \frac{P}{2f},$$

the signal shown in formula (1), where P is a positive integer. Herein preferably, P is 1 or 2, and a first digital signal is obtained:

$$x(nT) = (-1)^n \left[ \sum_{k=1}^{K} c_k s_i(nT-\tau_k)\cos(\theta - 2\pi f \tau_k) + \sum_{k=1}^{K} c_k s_q(nT-\tau_k)\sin(\theta - 2\pi f \tau_k) \right] \quad \text{formula (2)}$$

The near-field reflected self-interference channel estimation module obtains linear equations in 2M unknowns according to the first digital signal. Specifically, if $\tau_k = N_k T + \tau_k'$, where $0 \leq \tau_k' < T$, the foregoing formula may be approximately:

$$x(n) = \qquad\qquad\qquad\qquad\qquad\text{formula (3)}$$
$$(-1)^n \left[ \sum_{k=1}^{K} c_k \cos\varphi_k \cdot s_i(n - N_k) + \sum_{k=1}^{K} c_k \sin\varphi_k \cdot s_q(n - N_k) \right]$$

where, $\varphi_k = \theta - 2\pi f \tau_k'$; and $x(nT)$, $s_i(nT)$, and $s_q(nT)$ are abbreviated to $x(n)$, $s_i(n)$, and $s_q(n)$ for separate descriptions. Assuming $a_k = c_k \cos\varphi_k$ and $b_k = c_k \sin\varphi_k$, that is, $c_k = \sqrt{a_k^2 + b_k^2}$ and $\varphi_k = \arctan(b_k/a_k)$, formula (2) is further expressed as:

$$x(n) = (-1)^n \left[ \sum_{k=1}^{K} a_k s_i(n - N_k) + \sum_{k=1}^{K} b_k s_q(n - N_k) \right] \quad \text{formula (4)}$$

Assuming that multiple paths are distributed within a delay range MT, where M>K, formula (4) may be further expressed as:

$$x(n) = (-1)^n \left[ \sum_{m=0}^{M} a_m s_i(n - m) + \sum_{m=0}^{M} b_m s_q(n - m) \right] \quad \text{formula (5)}$$

Therefore, the linear equations in 2M unknowns are obtained:

$$\sum_{m=0}^{M} s_i(n - m) \cdot a_m + s_q(n - m) \cdot b_m = (-1)^n x(n), \quad \text{formula (6)}$$
$$n = 0, 1, \ldots N, \; N \geq 2M$$

The linear equations may be solved by using a method of least squares, and therefore estimated values of a first delay parameter $N_k = m$, a first amplitude and phase adjustment parameter $a_k$, and a second amplitude and phase adjustment parameter $b_k$ may be obtained.

In addition, $\tau_k = N_k T + \tau_k'$ is substituted into formula (1), and the following is obtained:

$$x(t) \approx \sum_{k=1}^{K} (-1)^{N_k} [c_k s_i(t - N_k T)\cos(\omega t + \varphi_k) + \quad \text{formula (7)}$$
$$c_k s_q(t - N_k T)\sin(\omega t + \varphi_k)]$$
$$= \sum_{k=1}^{K} a_k (-1)^{N_k} [s_i(t - N_k T)\cos\omega t + s_q(t - N_k T)\sin\omega t] +$$
$$\sum_{k=1}^{K} b_k (-1)^{N_k} [s_q(t - N_k T)\cos\omega t - s_i(t - N_k T)\sin\omega t]$$

If a radio frequency transmit signal whose initial phase is zero is $s_0(t) = s_i(t)\cos\omega t + s_q(t)\sin\omega t$, a signal after $s_0(t)$ is delayed by $$\frac{1}{4f}$$

(namely, ¼ wavelength) is:

$$s_1(t) = s_0\left(t + \frac{1}{4f}\right) \approx s_q(t)\cos\omega t - s_i(t)\sin\omega t,$$

and therefore:

$$\begin{cases} s_0(t - N_k T) = (-1)^{N_k} [s_i(t - N_k T)\cos\omega t + s_q(t - N_k T)\sin\omega t] \\ s_1(t - N_k T) = (-1)^{N_k} [s_q(t - N_k T)\cos\omega t - s_i(t - N_k T)\sin\omega t] \end{cases} \quad \text{formula (8)}$$

After formula (8) is substituted into formula (7), the following may be obtained:

$$x(t) = \sum_{k=1}^{K} a_k s_0(t - N_k T) + \sum_{k=1}^{K} b_k s_1(t - N_k T) \quad \text{formula (9)}$$

Therefore, the near-field reflected self-interference signal may be reconstructed by using the obtained estimated values of the parameters $N_k$, $a_k$, and $b_k$, and formula (9). By adjusting the delay of the radio frequency transmit signal $s(t) = s_i(t)\cos(\omega t + \theta) + s_q(t)\sin(\omega t + \theta)$, radio frequency reference signals $s_0(t)$ and $s_1(t)$ whose initial phases $\theta$ are zero may be obtained.

Because the parameters $a_k$ and $b_k$ in formula (9) may be negative values, but an actual passive radio frequency signal amplitude controller such as an attenuator cannot implement a function of signal inverting (a negative value), positive amplitude values $|a_k|$ and $|b_k|$ may be used. When $a_k$ and $b_k$ are negative values, a corresponding signal may be approximately delayed by a half wavelength, namely, phase-shifted by 180 degrees for implementation.

In the foregoing analysis, assuming that a sampling rate of the ADC is $$T = \frac{P}{2f},$$

if the sampling rate is $$T = \frac{P}{2f},$$

a signal sampled from the signal shown in formula (1) is:

$$x(n) = \sum_{k=1}^{K} c_k s_i(n - N_k)\cos(nP\pi + \phi) + \quad \text{formula (10)}$$
$$\sum_{k=1}^{K} c_k s_q(n - N_k)\sin(nP\pi + \phi)$$

where, $\phi=\theta-N_k P\pi-2\pi f\tau_k'$. It can be seen that when P is not an integer, $\cos(nP\pi+\phi)$ and $\sin(nP\pi+\phi)$ are values that change with sampling time. Therefore, the linear equations shown in formula (5) cannot be obtained. Therefore, the sampling rate of the ADC is $$T = \frac{P}{2f},$$

where P is a positive integer.

Therefore, the near-field reflected self-interference channel estimation module 1402 shown in FIG. 5, FIG. 6, and FIG. 7 obtains the estimated values of the parameters $N_k$, $a_k$, and $b_k$ by solving the linear equations shown in formula (6). The near-field reflected self-interference signal reconstruction module shown in FIG. 5, FIG. 6 and FIG. 7 reconstructs the near-field reflected self-interference signal according to formula (9) by using the radio frequency reference signals $s_0(t)$ and $s_1(t)$ and the estimated values that are of the parameters $N_k$, $a_k$, and $b_k$ and that are obtained by the near-field reflected self-interference channel estimation module.

Specifically, referring to an embodiment of the near-field reflected self-interference signal reconstruction module 1403 shown in FIG. 8, a K tributary delay selection circuit is included in the figure; M delay signals with an interval being an integer multiple of T are generated, and then an M-to-K radio frequency selection switch selects corresponding K delay signals, according to the value that is of the parameter $N_k$ and that is obtained through estimation by the near-field reflected self-interference channel estimation module; after the K delay signals pass through corresponding amplitude and phase adjusters separately, the K delay signals are combined by the combiner, and a reconstructed near-field reflected self-interference signal is obtained. Exemplarily, if the carrier frequency of the radio frequency reference signal is f=2 GHz and P=2, T=0.5 ns; if a quantity of delay taps is M=40 and K=8, a near-field reflected self-interference signal whose delay is MT=20 ns may be reconstructed at most. This is equal to a signal reflected by a reflector that is three meters away from an emitter.

Optionally, FIG. 9 shows another embodiment of the near-field reflected self-interference signal reconstruction module 1403. In FIG. 9, a K tributary delay selection circuit different from that in FIG. 8 is used, and M delay signals with an interval being an integer multiple of T are generated by using analog tap delayers (specifically, delay lines may be used as delayers). That is, the radio frequency reference signal sequentially passes through M delay lines whose delay time is T, and a signal is obtained by a coupler by coupling after each delay line.

Referring to the amplitude and phase adjuster provided by FIG. 10, as described above, because the first amplitude and phase adjustment parameter $a_k$ and the second amplitude and phase adjustment parameter $b_k$ may be negative values, but actually an amplitude controller such as an attenuator cannot implement a function of signal inverting (a negative value), a corresponding radio frequency signal may be approximately delayed by a half wavelength, namely, phase-shifted by 180 degrees for implementation. A specific implementation manner is provided: In FIG. 10, a tributary without a delayer and a tributary with a delayer 1 (the delayer 1 can implement a ½ wavelength delay) correspond to signals $x_0(t)$ and $-x_0(t)$ respectively in formula (9); when the parameter $a_k$ is a positive number, the radio frequency selection switch (the radio frequency selection switch is a 2-to-1 radio frequency selection switch, that is, one signal may be selected from two input signals according to the parameter $a_k$ and output) selects to output a signal of the tributary without a delay; and when the parameter $a_k$ is a negative number, the radio frequency selection switch selects to output a signal of the tributary with a ½ wavelength delay. Similarly, tributaries with a delayer 2 (with a ¼ wavelength delay) and a delayer 3 (with a ¾ wavelength delay) correspond to signals $s_1(t)$ and $-s_1(t)$ in formula (9); when the parameter $b_k$ is a positive number, the radio frequency switch selects to output a signal of the tributary with a ¼ wavelength delay; and when the parameter $b_k$ is a negative number, the radio frequency switch selects to output a signal of the tributary with a ¾ wavelength delay.

FIG. 11 shows another embodiment of the amplitude and phase adjuster. Amplitude and phase values may be obtained directly by using a relationship between the first amplitude and phase adjustment parameter $a_k$ and the second amplitude and phase adjustment parameter $b_k$: $c_k=\sqrt{a_k^2+b_k^2}$, $\varphi_k=\arctan(b_k/a_k)$. Therefore, a digital-controlled attenuator and a digital-controlled phase shifter are adjusted respectively according to values of $c_k$ and $\varphi_k$ by using the manner shown in FIG. 11, to implement amplitude and phase control over each tributary.

It should be noted that when a full duplex transceiver performs reception and transmission by using multiple antennas (Multiple Input Multiple Output, MIMO), a receive tributary corresponding to each receive antenna requires a near-field jammer corresponding to each transmit antenna, for reconstructing a near-field reflected self-interference signal corresponding to each transmit tributary and canceling interference components in radio frequency receive signals one by one.

In the interference cancellation apparatus according to the embodiment of the present disclosure, for a radio frequency receive signal obtained by a main receive antenna, interference cancellation processing is performed according to a radio frequency reference signal to cancel a main-path self-interference signal component in the radio frequency receive signal; and for a radio frequency receive signal obtained after the main-path self-interference signal component is canceled, near-field reflected self-interference cancellation processing is performed by means of near-field reflected self-interference channel estimation and near-field reflected self-interference signal reconstruction. In this way, a near-field reflected self-interference component in the radio frequency receive signal can be canceled.

The interference cancellation apparatus according to the embodiment of the present disclosure is described in detail above with reference to FIG. 1 to FIG. 11.

Figure 12:
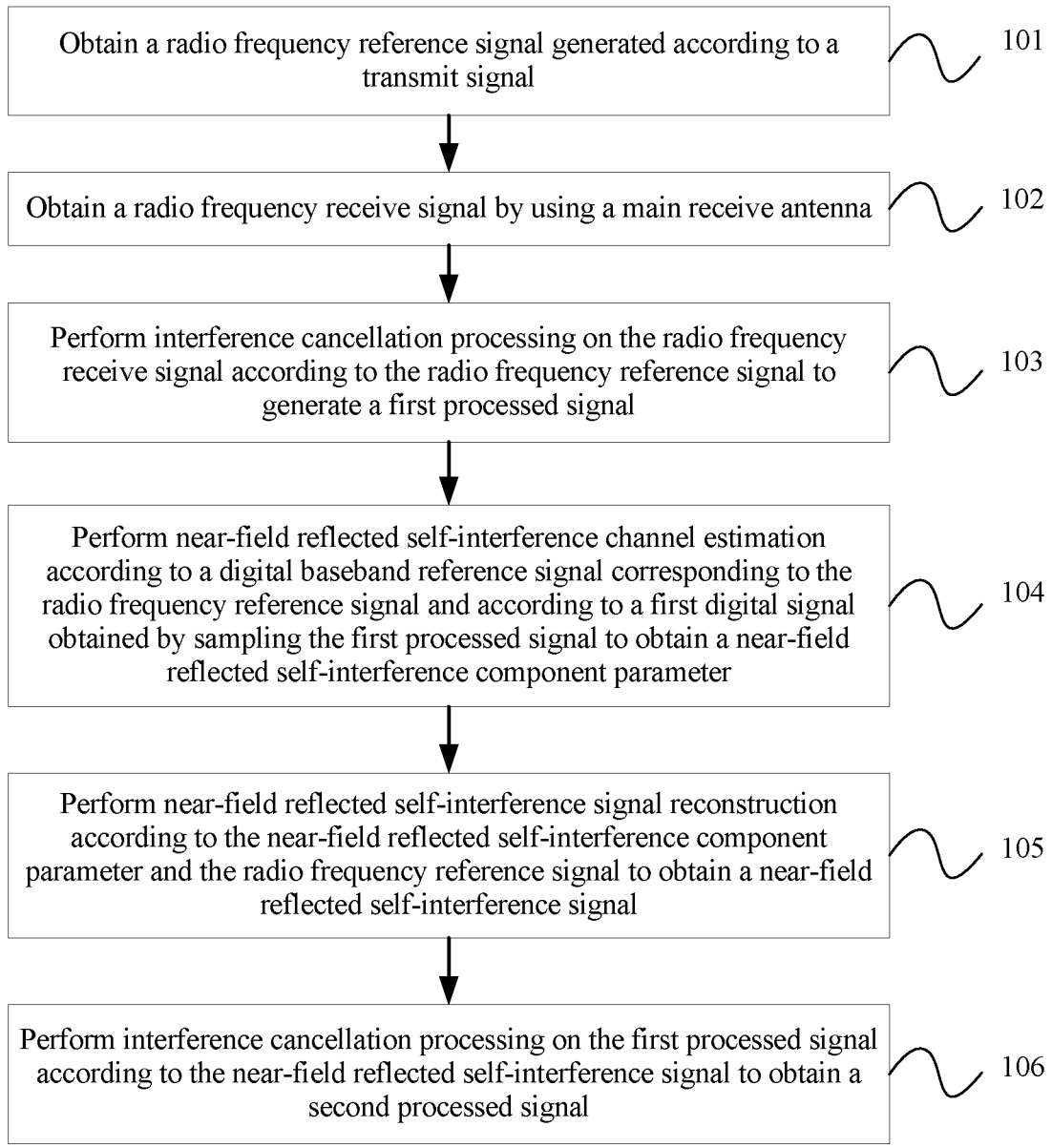
FIG. 12 is a schematic flowchart of an interference cancellation method according to an embodiment of the present disclosure.

The following describes in detail an interference cancellation method according to an embodiment of the present disclosure with reference to FIG. 12.

FIG. 12 shows a schematic flowchart of an interference cancellation method, where the method includes the following steps:

101. Obtain a radio frequency reference signal generated according to a transmit signal.

102. Obtain a radio frequency receive signal by using a main receive antenna.

103. Perform interference cancellation processing on the radio frequency receive signal according to the radio frequency reference signal to generate a first processed signal.

104. Perform near-field reflected self-interference channel estimation according to a digital baseband reference signal corresponding to the radio frequency reference signal and according to a first digital signal obtained by sampling the first processed signal to obtain a near-field reflected self-interference component parameter.

105. Perform near-field reflected self-interference signal reconstruction according to the near-field reflected self-interference component parameter and the radio frequency reference signal to obtain a near-field reflected self-interference signal.

106. Perform interference cancellation processing on the first processed signal according to the near-field reflected self-interference signal to obtain a second processed signal.

Further, obtaining the first digital signal by sampling the first processed signal in step 104 specifically includes:

sampling the first processed signal at a sampling rate $$T = \frac{P}{f}$$

to obtain the first digital signal:

$$x(nT) = (-1)^n \left[ \sum_{k=1}^{K} c_k s_i(nT - \tau_k)\cos(\theta - 2\pi f \tau_k) + \sum_{k=1}^{K} c_k s_q(nT - \tau_k)\sin(\theta - 2\pi f \tau_k) \right];$$

where, f is a carrier frequency, $\theta$ is an initial phase, $s_i(t)$ and $s_q(t)$ are respectively I/Q components of a digital baseband reference signal $s_0(t)=s_i(t)+js_q(t)$, $c_k$ and $\tau_k$ respectively represent a signal amplitude and delay in each path, K is a total quantity of paths, and P is a positive integer.

Further, the performing near-field reflected self-interference channel estimation according to a digital baseband reference signal corresponding to the radio frequency reference signal and according to a first digital signal obtained by sampling the first processed signal to obtain a near-field reflected self-interference component parameter is specifically:

obtaining linear equations in 2M unknowns according to the first digital signal:

$$\sum_{m=0}^{M} s_i(n-m) \cdot a_m + s_q(n-m) \cdot b_m = (-1)^n x(n), n = 0, 1, \ldots N, N \geq 2M;$$

and solving the linear equations in 2M unknowns by using a method of least squares, to obtain the near-field reflected self-interference component parameter, where the near-field reflected self-interference component parameter includes a first delay parameter $N_k=m$, a first amplitude and phase parameter $a_k$, and a second amplitude and phase parameter $b_k$.

The specific process of obtaining linear equations in 2M unknowns according to the first digital signal is not further described herein. For details, reference may be made to the description of the foregoing embodiment.

The linear equations in 2M unknowns are solved by using the method of least squares, and the near-field reflected self-interference component parameter is obtained, where the near-field reflected self-interference component parameter includes the first delay parameter $N_k=m$, the first amplitude and phase parameter $a_k$, and the second amplitude and phase parameter $b_k$.

Specifically, in step 101, for example, a transmit signal processed by a transmit digital signal processing module, a digital-to-analog conversion module, an up conversion module, and a power amplification module in FIG. 1 may be used as a radio frequency reference signal, and input to, for example, a coupler or a power divider. Therefore, the radio frequency reference signal can be divided into two signals by the coupler or power divider, where one signal is used to generate a first processed signal and the other signal is used to generate a near-field reflected self-interference signal.

Optionally, before step 104, the method further includes: performing digital sampling on the radio frequency reference signal to obtain the digital baseband reference signal.

In addition, the coupler or power divider is used to divide the radio frequency reference signal into two signals in such a manner that waveforms of the two signals can be consistent with that of the transmit signal, which is advantageous to subsequent interference cancellation (including main-path interference cancellation and cancellation of the near-field reflected self-interference signal) based on the radio frequency reference signal, where waveform consistency includes that the waveforms are the same as the waveform of the transmit signal or that a waveform similarity is within a preset range.

Optionally, after the performing interference cancellation processing on the first processed signal according to the near-field reflected self-interference signal to obtain a second processed signal, the method further includes: amplifying the second processed signal.

Alternatively, before the performing near-field reflected self-interference signal reconstruction according to the near-field reflected self-interference component parameter and the radio frequency reference signal to obtain a near-field reflected self-interference signal, the method further includes: amplifying the radio frequency reference signal, so as to perform near-field reflected self-interference signal reconstruction according to the near-field reflected self-interference component parameter and the amplified radio frequency reference signal to obtain the near-field reflected self-interference signal; and before the performing interference cancellation processing on the first processed signal according to the near-field reflected self-interference signal to obtain a second processed signal, the method further includes: amplifying the first processed signal, so as to perform interference cancellation processing on the amplified first processed signal according to the near-field reflected self-interference signal to obtain the second processed signal.

The foregoing amplification of various signals is amplification performed by using a low noise amplifier (LNA). Directly amplifying the second processed signal may reduce a requirement of a transmitter side on power of a radio frequency transmit signal. Alternatively, separately amplifying the first processed signal before the interference cancellation processing and amplifying the radio frequency reference signal that enters the near-field reflected self-interference signal reconstruction module may also reduce a requirement on power of the radio frequency reference signal, and further reduce the requirement of the transmitter side on the power of the radio frequency transmit signal.

Optionally, the performing interference cancellation processing on the radio frequency receive signal according to the radio frequency reference signal in step 103 includes:

performing, based on the radio frequency receive signal, delay processing, amplitude adjustment processing, and phase adjustment processing on the radio frequency reference signal, so that an amplitude of the radio frequency reference signal is in a direction opposite or approximately opposite to an amplitude of a main-path self-interference signal in the radio frequency receive signal, and that a phase of the radio frequency reference signal is the same or approximately the same as a phase of the main-path self-interference signal in the radio frequency receive signal; or performing, based on the radio frequency receive signal, delay processing, amplitude adjustment processing, and phase adjustment processing on the radio frequency reference signal, so that an amplitude of the radio frequency reference signal is the same or approximately the same as an amplitude of a main-path self-interference signal in the radio frequency receive signal, and that a difference between a phase of the radio frequency reference signal and a phase of the main-path self-interference signal in the radio frequency receive signal is 180 degrees or approximately 180 degrees.

In the embodiment of the present disclosure, for example, an adjustment circuit constituted by a delayer, a phase adjuster, and an amplitude adjuster that are connected in series may be used for implementation. Therefore, in step 103, the amplitude and phase of the radio frequency reference signal may be adjusted by the adjustment circuit through delaying, phase shifting, attenuation, and the like. For example, through attenuation, the amplitude of the radio frequency reference signal can approach the amplitude of the main-path self-interference signal component in the radio frequency receive signal. Certainly, a best effect is that the amplitudes are the same. However, because an error exists in an actual application, the amplitudes may be adjusted to approximately the same. In addition, through phase shifting and/or delaying, the phase of the radio frequency reference signal may be adjusted to be opposite or approximately opposite to the phase of the main-path self-interference signal component (namely, the main-path self-interference signal) in the radio frequency receive signal.

Afterward, radio frequency reference signals obtained after delay processing, amplitude adjustment, and phase adjustment may be combined with (for example, added to) the radio frequency receive signal, to cancel the main-path self-interference signal component in the radio frequency receive signal. In this way, main-path interference cancellation processing is implemented for the radio frequency receive signal, and the signal obtained after the processing is used as the first processed signal.

For illustration instead of limitation, in the embodiment of the present disclosure, the amplitude adjuster may be an attenuator. The phase adjuster may be a phase shifter, and the delayer may be a delay line.

It should be understood that the foregoing illustrated method and process for performing main-path interference cancellation processing on the radio frequency receive signal based on the reference signal are intended for exemplary description only, but the present disclosure is not limited thereto. For example, the delayer, phase shifter, and attenuator may also be adjusted in a manner of minimizing strength of the first processed signal.

Optionally, the near-field reflected self-interference component parameter includes a first delay parameter, a first amplitude and phase parameter, and a second amplitude and phase parameter; and the performing near-field reflected self-interference signal reconstruction according to the near-field reflected self-interference component parameter and the radio frequency reference signal to obtain a near-field reflected self-interference signal in step 105 includes:

dividing the radio frequency reference signal into at least one radio frequency reference signal, and performing delay processing on each radio frequency reference signal to form a delay signal of at least one radio frequency reference signal;

selecting, from delay signals of all radio frequency reference signals, a delay signal of at least one radio frequency reference signal according to the first delay parameter;

performing, according to the first amplitude and phase parameter and the second amplitude and phase parameter, amplitude and phase adjustment on the selected delay signal of the at least one radio frequency reference signal; and combining delay signals of radio frequency reference signals after amplitude and phase adjustment, to generate the near-field reflected self-interference signal.

Alternatively, the performing near-field reflected self-interference signal reconstruction according to the near-field reflected self-interference component parameter and the radio frequency reference signal to obtain a near-field reflected self-interference signal in step 105 includes:

performing delay processing on the radio frequency reference signal for at least one time, to form a delay signal of at least one radio frequency reference signal;

selecting, from delay signals of all radio frequency reference signals, a delay signal of at least one radio frequency reference signal according to the first delay parameter;

performing, according to the first amplitude and phase parameter and the second amplitude and phase parameter, amplitude and phase adjustment on the selected delay signal of the at least one radio frequency reference signal; and combining delay signals of radio frequency reference signals after amplitude and phase adjustment, to generate the near-field reflected self-interference signal.

Further, in step 105, the performing, according to the first amplitude and phase parameter and the second amplitude and phase parameter, amplitude and phase adjustment on the selected delay signal of the at least one radio frequency reference signal, may be implemented in the following two manners.

Manner 1 includes:

dividing the delay signal of one radio frequency reference signal into four tributary signals;

performing delay processing on any three of the four tributary signals;

selecting one tributary signal from two tributary signals according to the first amplitude and phase parameter after delay processing is performed on the any three tributary signals, and performing amplitude adjustment processing;

selecting one tributary signal from the other two tributary signals according to the second amplitude and phase parameter, and performing amplitude adjustment processing; and combining the tributary signals after attenuation processing, to form an amplitude- or phase-adjusted delay signal of the radio frequency reference signal.

Manner 2 includes:

performing, according to the first amplitude and phase parameter and the second amplitude and phase parameter, amplitude adjustment processing on the delay signal of the radio frequency reference signal; and performing, according to the first amplitude and phase parameter and the second amplitude and phase parameter, phase shift processing on a delay signal that is of the radio frequency reference signal and that is obtained after amplitude adjustment processing is performed.

According to the description of the foregoing embodiment, further, the transmit signal includes a near-field reflection channel detection timeslot and a data transmission timeslot that are disposed at an interval. In the near-field reflection channel detection timeslot, a communications peer does not transmit a signal, and a signal received by a receiver side includes only a self-interference signal. Because there is no signal from the communications peer, the receiver side may perform near-field reflected self-interference channel estimation in the near-field reflection channel detection timeslot to obtain a near-field reflected self-interference component parameter, where the near-field reflected self-interference component parameter may include transmission path delay, phase, and amplitude parameters of a near-field reflected self-interference component. In the data transmission timeslot, a signal received by the receiver side includes a self-interference signal and a data signal, and the receiver side may reconstruct, in the data transmission timeslot, a near-field reflected self-interference signal according to the radio frequency reference signal and the near-field reflected self-interference component parameter. A specific embodiment is not further described herein. For details, reference may be made to the description in the apparatus embodiment.

According to the interference cancellation method provided in the embodiment of the present disclosure, for a radio frequency receive signal obtained by a main receive antenna, interference cancellation processing is performed according to a radio frequency reference signal to cancel a main-path self-interference signal component in the radio frequency receive signal; and for a radio frequency receive signal obtained after the main-path self-interference signal component is canceled, near-field reflected self-interference cancellation processing is performed by means of near-field reflected self-interference channel estimation and near-field reflected self-interference signal reconstruction. In this way, a near-field reflected self-interference component in the radio frequency receive signal can be canceled.

A person of ordinary skill in the art may be aware that, in combination with the examples described in the embodiments disclosed in this specification, units and algorithm steps may be implemented by electronic hardware or a combination of computer software and electronic hardware. Whether the functions are performed by hardware or software depends on particular applications and design constraint conditions of the technical solutions. A person skilled in the art may use different methods to implement the described functions for each particular application, but it should not be considered that the implementation goes beyond the scope of the present disclosure.

It may be clearly understood by a person skilled in the art that, for the purpose of convenient and brief description, for a detailed working process of the foregoing system, apparatus, and unit, reference may be made to a corresponding process in the foregoing method embodiments, and details are not described herein again.

It should be understood that sequence numbers of the foregoing processes do not mean execution sequences in various embodiments of the present disclosure. The execution sequences of the processes should be determined according to functions and internal logic of the processes, and should not be construed as any limitation on the implementation processes of the embodiments of the present disclosure.

In the several embodiments provided in the present application, it should be understood that the disclosed apparatus may be implemented in other manners. For example, the described apparatus embodiment is merely exemplary. For example, the unit division is merely logical function division and may be other division in actual implementation. For example, a plurality of units or parts may be combined or integrated into another system, or some features may be ignored or not performed. In addition, the shown or discussed mutual couplings or direct couplings or communication connections may be implemented through some interfaces. The indirect couplings or communication connections between the apparatuses or units may be implemented in electrical, mechanical, or other forms.

The units described as separate parts may or may not be physically separated, and parts shown as units may or may not be physical units, may be located in one position, or may be distributed on a plurality of network units. Some or all of the units may be selected according to actual needs to achieve the objectives of the solutions of the embodiments.

In addition, functional units in the embodiments of the present disclosure may be integrated into one processing unit, or each of the units may exist alone physically, or two or more units are integrated into one unit.

When the functions are implemented in the form of a software functional unit and sold or used as an independent product, the functions may be stored in a computer-readable storage medium. Based on such an understanding, the technical solutions of the present disclosure essentially, or the part contributing to the prior art, or some of the technical solutions may be implemented in a form of a software product. The computer software product is stored in a storage medium, and includes several instructions for instructing a computer device (which may be a personal computer, a server, or a network device) to perform all or some of the steps of the methods described in the embodiments of the present disclosure. The foregoing storage medium includes: any medium that can store program code, such as a USB flash drive, a removable hard disk, a read-only memory (ROM, Read-Only Memory), a random access memory (RAM, Random Access Memory), a magnetic disk, or an optical disc.

The foregoing descriptions are merely specific implementation manners of the present disclosure, but are not intended to limit the protection scope of the present disclosure. Any variation or replacement readily figured out by a person skilled in the art within the technical scope disclosed in the present disclosure shall fall within the protection scope of the present disclosure. Therefore, the protection scope of the present disclosure shall be subject to the protection scope of the claims.

What is claimed is:

1. An apparatus, comprising:
  a main receive antenna, configured to receive a radio frequency receive signal, and transmit the radio frequency receive signal to a main-path self-interference canceller;
  a divider, configured to obtain a radio frequency reference signal generated according to a transmit signal, and transmit the radio frequency reference signal to the main-path self-interference canceller and a near-field reflected self-interference canceller;

the main-path self-interference canceller, configured to receive the radio frequency reference signal transmitted by the divider and the radio frequency receive signal transmitted by the main receive antenna, and perform interference cancellation on the radio frequency receive signal according to the radio frequency reference signal to obtain a first processed signal; and the near-field reflected self-interference canceller, configured to receive the radio frequency reference signal transmitted by the divider and the first processed signal obtained by the main-path self-interference canceller, perform near-field reflected self-interference channel estimation according to a digital baseband reference signal corresponding to the radio frequency reference signal and according to a first digital signal obtained by sampling the first processed signal to obtain a near-field reflected self-interference component parameter, perform near-field reflected self-interference signal reconstruction according to the near-field reflected self-interference component parameter and the radio frequency reference signal to generate a near-field reflected self-interference signal, and perform interference cancellation processing on the first processed signal according to the near-field reflected self-interference signal to obtain a second processed signal;

wherein the near-field reflected self-interference canceller comprises:

a first analog-to-digital converter, configured to receive the first processed signal obtained by the main-path self-interference canceller, perform digital sampling on the first processed signal to obtain the first digital signal, and transmit the first digital signal to a near-field reflected self-interference channel estimation circuit;

the near-field reflected self-interference channel estimation circuit, configured to receive the first digital signal transmitted by the first analog-to-digital converter, obtain the digital baseband reference signal corresponding to the radio frequency reference signal, perform near-field reflected self-interference channel estimation according to the first digital signal and the digital baseband reference signal to obtain the near-field reflected self-interference component parameter, and transmit the near-field reflected self-interference component parameter to a near-field reflected self-interference signal reconstruction circuit; and the near-field reflected self-interference signal reconstruction circuit, configured to receive the near-field reflected self-interference component parameter obtained by the near-field reflected self-interference channel estimation circuit and the radio frequency reference signal transmitted by the divider, and perform near-field reflected self-interference signal reconstruction according to the near-field reflected self-interference component parameter and the radio frequency reference signal to obtain the near-field reflected self-interference signal;

wherein the near-field reflected self-interference canceller further comprises:

a second analog-to-digital converter, configured to receive the radio frequency reference signal, and perform digital sampling on the radio frequency reference signal to obtain the digital baseband reference signal.

2. The apparatus according to claim 1, wherein the first analog-to-digital converter is configured to:

sample the first processed signal at a sampling rate $$T = \frac{P}{2f}$$

to obtain the first digital signal:

$$x(nT) = (-1)^n \left[ \sum_{k=1}^{K} c_k s_i(nT - \tau_k)\cos(\theta - 2\pi f \tau_k) + \sum_{k=1}^{K} c_k s_q(nT - \tau_k)\sin(\theta - 2\pi f \tau_k) \right];$$

wherein, f is a carrier frequency, $\theta$ is an initial phase, $s_i(t)$ and $s_q(t)$ are respectively I/Q components of a digital baseband reference signal $s_0(t)=s_i(t)+js_q(t)$, $c_k$ and $\tau_k$ respectively represent a signal amplitude and delay in each path, K is a total number of paths, and P is a positive integer.

3. The apparatus according to claim 2, wherein the near-field reflected self-interference canceller further comprises:

a first amplifier, wherein the first amplifier is configured to amplify the second processed signal.

4. The apparatus according to claim 2, wherein the near-field reflected self-interference canceller further comprises:

a second amplifier, configured to amplify the radio frequency reference signal transmitted to the near-field reflected self-interference signal reconstruction circuit; and a third amplifier, configured to amplify the first processed signal before interference cancellation processing is performed.

5. The apparatus according to claim 2, wherein the near-field reflected self-interference component parameter comprises a first delay parameter, a first amplitude and phase parameter, and a second amplitude and phase parameter; and the near-field reflected self-interference signal reconstruction circuit comprises a power divider, a first radio frequency selection switch, a first delayer group disposed between the power divider and the first radio frequency selection switch, a first amplitude and phase adjuster group, and a first combiner, wherein:

the power divider is configured to receive the radio frequency reference signal, and divide the radio frequency reference signal into at least one radio frequency reference signal;

the first delayer group comprises at least one delayer, wherein each delayer is configured to perform delay processing on one radio frequency reference signal to form a delay signal of one radio frequency reference signal;

the first radio frequency selection switch is configured to receive the delay signal of the at least one radio frequency reference signal, and select, from delay signals of all radio frequency reference signals, a delay signal of at least one radio frequency reference signal according to the first delay parameter;

the first amplitude and phase adjuster group comprises at least one amplitude and phase adjuster, wherein each amplitude and phase adjuster is configured to perform, according to the first amplitude and phase parameter and the second amplitude and phase parameter, amplitude and phase adjustment on a delay signal that is of one radio frequency reference signal and that is selected by the first radio frequency selection switch; and the first combiner is configured to combine delay signals of radio frequency reference signals after amplitude and phase adjustment, to generate the near-field reflected self-interference signal.

6. The apparatus according to claim 5, wherein the amplitude and phase adjuster comprises:
a power divider, a third delayer group, a radio frequency switch group, an attenuator group, and a third combiner, wherein:
the power divider is configured to receive the delay signal that is of the radio frequency reference signal and that is selected by the radio frequency selection switch, and divide the selected delay signal of the radio frequency reference signal into four tributary signals;
the third delayer group comprises three delayers, wherein the delayers are configured to perform delay processing on any three of the four tributary signals;
the radio frequency switch group comprises two radio frequency selection switches, wherein one radio frequency selection switch is configured to select one tributary signal from two tributary signals according to the first amplitude and phase parameter after delay processing is performed on the any three tributary signals, and the other radio frequency switch is configured to select one tributary signal from the other two tributary signals according to the second amplitude and phase parameter after delay processing is performed on the any three tributary signals;
the attenuator group comprises two attenuators, wherein the attenuators are configured to perform amplitude adjustment processing on the tributary signals selected by the radio frequency switch group; and
the third combiner is configured to combine the tributary signals after amplitude adjustment processing, to form an amplitude- or phase-adjusted delay signal of the radio frequency reference signal.

7. The apparatus according to claim 5, wherein the amplitude and phase adjuster comprises an attenuator and a phase shifter, wherein:
the attenuator is configured to perform, according to the first amplitude and phase parameter and the second amplitude and phase parameter, amplitude adjustment processing on the received delay signal that is of the radio frequency reference signal and that is transmitted by the radio frequency selection switch; and
the phase shifter is configured to perform, according to the first amplitude and phase parameter and the second amplitude and phase parameter, phase shift processing on a delay signal that is of the radio frequency reference signal and that is obtained after amplitude adjustment processing is performed by the attenuator.

8. The apparatus according to claim 1, wherein the near-field reflected self-interference component parameter comprises a first delay parameter, a first amplitude and phase parameter, and a second amplitude and phase parameter; and
the near-field reflected self-interference signal reconstruction circuit comprises:
a second delayer group, a second radio frequency selection switch, a second amplitude and phase adjuster group, and a second combiner, wherein:
the second delayer group comprises at least one delayer, wherein the at least one delayer is connected in series, and the second delayer group is configured to receive the radio frequency reference signal, and perform delay processing on the radio frequency reference signal by using the at least one delayer sequentially, to form a delay signal of at least one radio frequency reference signal;
the second radio frequency selection switch is configured to receive the delay signal of the at least one radio frequency reference signal, and select, from delay signals of all radio frequency reference signals, a delay signal of at least one radio frequency reference signal according to the first delay parameter;
the second amplitude and phase adjuster group comprises at least one amplitude and phase adjuster, wherein each amplitude and phase adjuster is configured to perform, according to the first amplitude and phase parameter and the second amplitude and phase parameter, amplitude and phase adjustment on a delay signal that is of one radio frequency reference signal and that is selected by the second radio frequency selection switch; and
the second combiner is configured to combine delay signals of radio frequency reference signals after amplitude and phase adjustment, to generate the near-field reflected self-interference signal.

9. The apparatus according to claim 1, wherein:
the main-path self-interference canceller is configured to do at least one of: perform, based on the radio frequency receive signal, delay processing, amplitude adjustment processing, and phase adjustment processing on the radio frequency reference signal, so that an amplitude of the radio frequency reference signal is in a direction opposite or approximately opposite to an amplitude of a main-path self-interference signal in the radio frequency receive signal, and that a phase of the radio frequency reference signal is the same or approximately the same as a phase of the main-path self-interference signal in the radio frequency receive signal; and
perform, based on the radio frequency receive signal, delay processing, amplitude adjustment processing, and phase adjustment processing on the radio frequency reference signal, so that an amplitude of the radio frequency reference signal is the same or approximately the same as an amplitude of a main-path self-interference signal in the radio frequency receive signal, and that a difference between a phase of the radio frequency reference signal and a phase of the main-path self-interference signal in the radio frequency receive signal is 180 degrees or approximately 180 degrees.

10. An interference cancellation method, comprising:
obtaining a radio frequency reference signal generated according to a transmit signal;
obtaining a radio frequency receive signal by using a main receive antenna;
performing interference cancellation processing on the radio frequency receive signal according to the radio frequency reference signal to generate a first processed signal;
performing near-field reflected self-interference channel estimation according to a digital baseband reference signal corresponding to the radio frequency reference signal and according to a first digital signal obtained by sampling the first processed signal to obtain a near-field reflected self-interference component parameter;
performing near-field reflected self-interference signal reconstruction according to the near-field reflected self-interference component parameter and the radio frequency reference signal to obtain a near-field reflected self-interference signal; and performing interference cancellation processing on the first processed signal according to the near-field reflected self-interference signal to obtain a second processed signal;

wherein before performing near-field reflected self-interference signal reconstruction according to the near-field reflected self-interference component parameter and the radio frequency reference signal to obtain a near-field reflected self-interference signal, the method further comprises: amplifying the radio frequency reference signal, so as to perform near-field reflected self-interference signal reconstruction according to the near-field reflected self-interference component parameter and the amplified radio frequency reference signal to obtain the near-field reflected self-interference signal; and before performing interference cancellation processing on the first processed signal according to the near-field reflected self-interference signal to obtain a second processed signal, the method further comprises: amplifying the first processed signal, so as to perform interference cancellation processing on the amplified first processed signal according to the near-field reflected self-interference signal to obtain the second processed signal.

11. The method according to claim 10, wherein obtaining the first digital signal by sampling the first processed signal specifically comprises:

sampling the first processed signal at a sampling rate $$T = \frac{P}{2f}$$

to obtain the first digital signal:

$$x(nT) = (-1)^n \left[ \sum_{k=1}^{K} c_k s_i(nT - \tau_k)\cos(\theta - 2\pi f \tau_k) + \sum_{k=1}^{K} c_k s_q(nT - \tau_k)\sin(\theta - 2\pi f \tau_k) \right];$$

wherein, f is a carrier frequency, $\theta$ is an initial phase, $s_i(t)$ and $s_q(t)$ are respectively I/Q components of a digital baseband reference signal $s_0(t)=s_i(t)+js_q(t)$, $c_k$ and $\tau_k$ respectively represent a signal amplitude and delay in each path, K is a total quantity of paths, and P is a positive integer.

12. The method according to claim 11, wherein performing near-field reflected self-interference channel estimation according to a digital baseband reference signal corresponding to the radio frequency reference signal and according to a first digital signal obtained by sampling the first processed signal to obtain a near-field reflected self-interference component parameter is specifically:

obtaining linear equations in 2M unknowns according to the first digital signal:

$$\sum_{m=0}^{M} s_i(n-m) \cdot a_m + s_q(n-m) \cdot b_m = (-1)^n x(n), n = 0, 1, \ldots N, N \geq 2M;$$

and solving the linear equations in 2M unknowns by using a method of least squares, to obtain the near-field reflected self-interference component parameter, wherein the near-field reflected self-interference component parameter comprises a first delay parameter $N_k=m$, a first amplitude and phase parameter $a_k$, and a second amplitude and phase parameter $b_k$.

13. The method according to claim 10, wherein before performing near-field reflected self-interference channel estimation according to a digital baseband reference signal corresponding to the radio frequency reference signal and according to a first digital signal obtained by sampling the first processed signal to obtain a near-field reflected self-interference component parameter, the method further comprises: performing digital sampling on the radio frequency reference signal to obtain the digital baseband reference signal.

14. The method according to claim 10, wherein after performing interference cancellation processing on the first processed signal according to the near-field reflected self-interference signal to obtain a second processed signal, the method further comprises: amplifying the second processed signal.

15. The method according to claim 10, wherein the near-field reflected self-interference component parameter comprises a first delay parameter, a first amplitude and phase parameter, and a second amplitude and phase parameter; and wherein performing near-field reflected self-interference signal reconstruction according to the near-field reflected self-interference component parameter and the radio frequency reference signal to obtain a near-field reflected self-interference signal comprises:

dividing the radio frequency reference signal into at least one radio frequency reference signal, and performing delay processing on each radio frequency reference signal to form a delay signal of at least one radio frequency reference signal;

selecting, from delay signals of all radio frequency reference signals, a delay signal of at least one radio frequency reference signal according to the first delay parameter;

performing, according to the first amplitude and phase parameter and the second amplitude and phase parameter, amplitude and phase adjustment on the selected delay signal of the at least one radio frequency reference signal; and combining delay signals of radio frequency reference signals after amplitude and phase adjustment, to generate the near-field reflected self-interference signal.

16. The method according to claim 10, wherein the near-field reflected self-interference component parameter comprises a first delay parameter, a first amplitude and phase parameter, and a second amplitude and phase parameter; and wherein performing near-field reflected self-interference signal reconstruction according to the near-field reflected self-interference component parameter and the radio frequency reference signal to obtain a near-field reflected self-interference signal comprises:

performing delay processing on the radio frequency reference signal for at least one time, to form a delay signal of at least one radio frequency reference signal;

selecting, from delay signals of all radio frequency reference signals, a delay signal of at least one radio frequency reference signal according to the first delay parameter;

performing, according to the first amplitude and phase parameter and the second amplitude and phase parameter, amplitude and phase adjustment on the selected delay signal of the at least one radio frequency reference signal; and combining delay signals of radio frequency reference signals after amplitude and phase adjustment, to generate the near-field reflected self-interference signal.

17. The method according to claim 10, wherein performing interference cancellation processing on the radio frequency receive signal according to the radio frequency reference signal comprises at least one of:

performing, based on the radio frequency receive signal, delay processing, amplitude adjustment processing, and phase adjustment processing on the radio frequency reference signal, so that an amplitude of the radio frequency reference signal is in a direction opposite or approximately opposite to an amplitude of a main-path self-interference signal in the radio frequency receive signal, and that a phase of the radio frequency reference signal is the same or approximately the same as a phase of the main-path self-interference signal in the radio frequency receive signal; and performing, based on the radio frequency receive signal, delay processing, amplitude adjustment processing, and phase adjustment processing on the radio frequency reference signal, so that an amplitude of the radio frequency reference signal is the same or approximately the same as an amplitude of a main-path self-interference signal in the radio frequency receive signal, and that a difference between a phase of the radio frequency reference signal and a phase of the main-path self-interference signal in the radio frequency receive signal is 180 degrees or approximately 180 degrees.

18. An interference cancellation method, comprising:
obtaining a radio frequency reference signal generated according to a transmit signal;
obtaining a radio frequency receive signal by using a main receive antenna;
performing interference cancellation processing on the radio frequency receive signal according to the radio frequency reference signal to generate a first processed signal;
performing near-field reflected self-interference channel estimation according to a digital baseband reference signal corresponding to the radio frequency reference signal and according to a first digital signal obtained by sampling the first processed signal to obtain a near-field reflected self-interference component parameter;
performing near-field reflected self-interference signal reconstruction according to the near-field reflected self-interference component parameter and the radio frequency reference signal to obtain a near-field reflected self-interference signal; and
performing interference cancellation processing on the first processed signal according to the near-field reflected self-interference signal to obtain a second processed signal;
wherein the near-field reflected self-interference component parameter comprises a first delay parameter, a first amplitude and phase parameter, and a second amplitude and phase parameter; and
wherein performing near-field reflected self-interference signal reconstruction according to the near-field reflected self-interference component parameter and the radio frequency reference signal to obtain a near-field reflected self-interference signal comprises:
performing delay processing on the radio frequency reference signal for at least one time, to form a delay signal of at least one radio frequency reference signal;
selecting, from delay signals of all radio frequency reference signals, a delay signal of at least one radio frequency reference signal according to the first delay parameter;
performing, according to the first amplitude and phase parameter and the second amplitude and phase parameter, amplitude and phase adjustment on the selected delay signal of the at least one radio frequency reference signal; and
combining delay signals of radio frequency reference signals after amplitude and phase adjustment, to generate the near-field reflected self-interference signal.

* * * * *